United States Patent
Wagner et al.

(10) Patent No.: US 9,753,832 B2
(45) Date of Patent: Sep. 5, 2017

(54) MINIMIZING BANDWITH TO COMPRESS OUTPUT STREAM IN INSTRUCTION TRACING SYSTEMS

(71) Applicant: Intel Corporation, Santa Clara, CA (US)

(72) Inventors: Ilya Wagner, Hillsboro, OR (US); Matthew C. Merten, Hillsboro, OR (US); Frank Binns, Hillsboro, OR (US); Christine E. Wang, Portland, OR (US); Mayank Bomb, Hillsboro, OR (US); Tong Li, Portland, OR (US); Thilo Schmitt, Biberach/Riβ (DE); M D A. Rahman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 13/930,501

(22) Filed: Jun. 28, 2013

(65) Prior Publication Data

US 2015/0006868 A1    Jan. 1, 2015

(51) Int. Cl.
*G06F 9/30* (2006.01)
*G06F 11/34* (2006.01)

(52) U.S. Cl.
CPC ........ *G06F 11/3466* (2013.01); *G06F 11/348* (2013.01); *G06F 2201/81* (2013.01)

(58) Field of Classification Search
None
See application file for complete search history.

(56) References Cited

U.S. PATENT DOCUMENTS

| 7,209,058 B2 * | 4/2007 | Swoboda | 341/63 |
| 7,673,187 B2 * | 3/2010 | Craske | 714/45 |
| 2004/0250164 A1 * | 12/2004 | Ahmad et al. | 714/30 |

* cited by examiner

*Primary Examiner* — Corey S Faherty
(74) *Attorney, Agent, or Firm* — Lowenstein Sandler LLP

(57) ABSTRACT

In accordance with embodiments disclosed herein, there is provided systems and methods for minimizing bandwidth to compress an output stream of an instruction tracing system. For example, the method may include identifying a current instruction in a trace of the IT module as a conditional branch (CB) instruction. The method includes executing one of generating a CB packet including a byte pattern with an indication of outcome of the CB instruction, or adding an indication of the outcome of the CB instruction to the byte pattern of an existing CB packet. The method includes generating a packet when a subsequent instruction in the trace is not the CB instruction. The packet is different from the CB packet. The method also includes adding the packet into a deferred queue when the packet is deferrable. The method further includes outputting the CB packet followed by the deferred packet into a packet log.

24 Claims, 16 Drawing Sheets

MINIMIZING BANDWITH TO COMPRESS OUTPUT STREAM IN INSTRUCTION TRACING SYSTEMS

TECHNICAL FIELD

The embodiments of the disclosure relate generally to processing devices and, more specifically, relate to minimizing bandwidth to compress output stream in an instruction tracing system.

BACKGROUND

An instruction tracing system (ITS) is a tracing capability, which provides a software execution control flow trace. The trace output is in the form of packets of variable sizes. A decoder may use the packets, along with the associated instruction bytes, to reconstruct the execution flow of the software that was traced.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
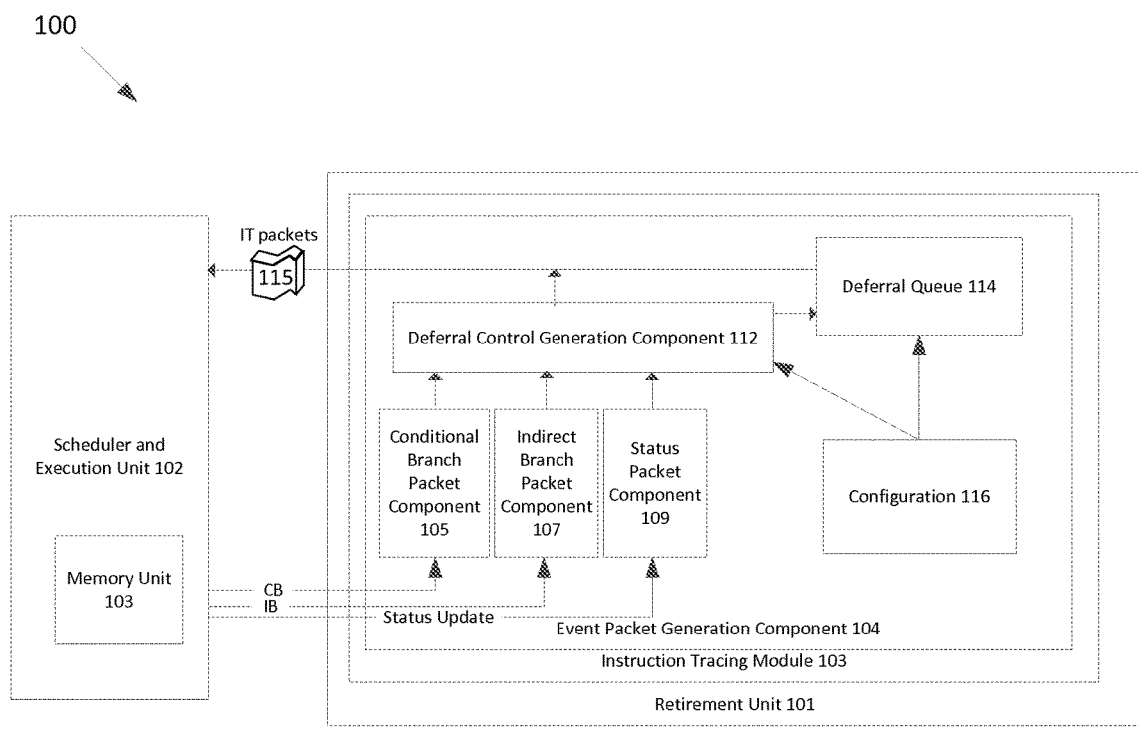
FIG. 1A illustrates an exemplary instruction tracing system (ITS) architecture of a processing device in accordance with which embodiments may operate.

Disclosed herein are embodiments for minimizing bandwidth to compress the output stream by an instruction tracing (IT) system. In one embodiment, the compression is provided by deferring generated packets from being sent in the output stream (e.g., trace) of the IT system until after other packable packets, such as conditional branch (CB) packets are either full or terminated by a non-deferrable packet.

The output stream of the IT system may typically consist of conditional branches (CB), separated by an occasional indirect branch (IB), which are further separated by less frequent other types of branches and mode changes. The CB may be an instruction in which a condition is applied to execution of the instruction. The CB may have one of two outcomes, a "taken" conditional branch (TCB) and "not-taken" conditional branch (NTCB). When a CB with a true condition occurs, it is said to be the "taken" branch, and the execution in the trace skips to another specified instruction pointer (IP). When a CB with a false condition occurs, it is said to be the "not-taken" or a "fall-through" branch, and the execution in the trace proceeds to a next sequential instruction pointer (IP). The CB provides an execution address in the form of an IP of the taken target, which is encoded in binary bits of the CB. An IP may be an address that specifies where an instruction is located. Specifically, the CB may provide a target location or address for transfer of the execution in the trace. Because the binary bytes of each instruction are available to a decoder of the IT output trace stream, the output trace stream does not need to record the IP subsequent to the CB, but rather contain only an indication of "taken" or "not-taken". Other types of packets may include event packets, which may include an updated status of the processing device.

One key problem for the IT system is to compress the output trace stream to require as few bits as possible. Compression of the output trace stream limits bandwidth required to extract the trace stream from the system (e.g., processor) being traced, limits the storage required to store an output trace stream, limits the likelihood of exceeding internal stream capacity and thus limits likelihood of an internal overflow. Internal overflow may occur when generation of new packets exceeds the output stream bandwidth, and any internal buffering is exhausted, thus leading to dropped packets. CB packets contain a variable amount of information in a fixed packet size. In one embodiment, a CB packet comprised of 1 byte may contain up to 6 bits that represent the outcomes of up to 6 conditional branches. In another embodiment, a CB packet comprised of 6 bytes may contain up to 46 bits that represent the outcomes of up to 46 conditional branches. Note that in some instances, the CB packet may contain the outcomes of fewer than the maximum number of CBs, and thus the unused bits are wasted. Typical decoders of IT output trace streams process the streams sequentially. Previously, an early closure of a CB packet, that is, generation and output of a CB packet before the maximum number of conditional branches are recorded in the packet, would be caused by IB packets and other packets generated before the CB packet has accumulated sufficient CB results (recorded as individual bits) to fill its byte pattern. This partial CB packet would then be sent into the output trace stream and followed by the IB and/or other packets.

Embodiments of the disclosure enable efficiency of CB packets that contain a variable amount of information in the packet in a fixed size, by deferring IB and other types of packets that would normally force the early closure of the CB packets. In one embodiment, the IB and other types of packets are added to a deferred queue. In one embodiment, an IT system defers a CB packet from being sent to the output trace stream while the IB and other types of packets are being generated. In one embodiment, the CB packet has a length of one byte and is generated and sent out in the output trace stream when a total number of bits in the byte pattern of the CB packet reach a first threshold. As an example, the first threshold is 6 bits. As another example, with a 6-byte CB packet that can contain a maximum of 46 branch outcomes, the threshold is the $43^{rd}$ bit, so that a maximum number of simultaneously retiring branches per cycle of 4 would be guaranteed to fit into the same CB packet. That is, after the cycle in which the 43rd bit is written, the CB packet and deferred packets would be sent to the output trace stream. Note that bits beyond the threshold bit may also be written into the packet in the same cycle before the packet is written to the output stream. In another embodiment, the CB packet is generated and sent out in the output trace stream when total number of packets in the deferred queue reaches a second threshold. As an example, the second threshold is the total size of the deferred queue. As another example, the second threshold would be set such that the maximum number of simultaneously deferrable packets could all be deferred or all be sent out non-deferred. As per this example, for an IT system with a deferred queue containing 32 entries and supporting up to 3 packets that can be deferred per cycle, the threshold would be set to 30. That is, in the cycle that the 30th deferred entry is written, the CB and deferred packets would be written to the output stream. Note that because 3 deferred packets could be generated in the same cycle, deferred queue entries beyond the threshold entry may also be written in the same cycle that the $30^{th}$ entry is written. In a further embodiment, the CB packet is generated and sent out in the output trace stream when an instruction in the trace, after the CB's associated instruction, generates a packet that is not deferrable. As such, any deferrable packets generated while the CB accumulates bits and which are stored in the deferred queue of the IT system are sent in the output trace stream following the CB packet, and are then followed by the non-deferrable packet.

In the following description, numerous specific details are set forth (for example, specific IT logic implementations, IT packet formats, hardware/firmware partitioning details, logic partitioning/integration details, processor configurations, micro-architectural details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

FIG. 1A illustrates an exemplary architecture 100 of a processing device in accordance with which embodiments may operate, including IT architecture that generates IT packets 115. In one embodiment, the processing device is a central processing unit (CPU). The processing device may also be referred to as a processor in portions of the present description.

More particularly, a retirement unit 101 includes an IT module 103, which receives information from a memory unit 103 in a scheduler and execution unit 102 and packetizes the information to output in the IT packets 115, which are sent to the scheduler and execution unit 102.

The information in the IT packets 115 may include a representation of the outcome of an instruction in the trace. The instruction may include a conditional branch (CB). The CB may be an instruction in which a condition applies to execution of the instruction (e.g., the condition should occur in order for the instruction to be executed). As discussed above, the CB may be one of a taken conditional branch outcome (TCB) and a not-taken conditional branch outcome (NTCB). With respect to the TCB, the execution in the trace skips to another specified instruction pointer (IP) in the binary and with respect to the NTCB, the execution in the trace proceeds to a next sequential IP in the binary. In one embodiment, the IP provides an execution address of the target in the trace and is encoded in binary bits of the CB.

In another embodiment, the execution includes an indirect branch (TB). An IB may be an instruction that obtains the target IP from an executed equation or from memory. Specifically, the IB obtains a target location or address for transfer of the execution in the trace from the execution engine of the processor. A decoder of an IT output trace stream, even with access to the binary, cannot determine the target of the IB branch. The IB may include, but is not limited to, return (RET), far branch, interrupt, exception, re-initialization (INIT), and transactional status (TSX) abort.

In further embodiments, the instruction may include an update in status of the processing device. Such updated status may include, but is not limited to, an execution mode, a current page table base (CR3), an interrupt and transactional execution (TSX) begin, a TSX abort, and a TSX commit instructions, which update this state, can generate other types of event packets.

The IT module 103 further includes an event packet generation component (EPGC) 104, which receives the instruction from the scheduler and execution unit 102. In one embodiment, the EPGC 104 extracts the instruction from the scheduler and execution unit 102. In other embodiments, the EPGC 104 receives the instruction from the scheduler and execution engine 102 upon request. In a further embodiment, the EPGC 104 automatically receives the instruction from the scheduler and execution unit 102.

In one embodiment, the EPGC 104 determines whether a packet should be generated based on the instruction received from the scheduler and execution unit 102. In one example, the instruction may include a comparison function associated with the instruction in the trace, and the EPGC 104 determines that a packet is not to be generated for this instruction. In another example, the instruction includes the CB, and EPGC 104 determines that a packet is to be generated for the CB. In another example, the instruction includes the IB, and the EPGC 104 determines that a packet is to be generated for the IB. In a further example the EPGC 104, the instruction includes an updated status of the processing device, and the EPGC 104 determines that packets are to be generated for this updated status.

The EPGC 104 may also include a conditional branch packet component (CBPC) 105, indirect branch packet component (IBPC) 107 and status packet component (SPC) 109. Based on the received instructions, the EPGC 104 forwards the instructions to one of the CBPC 105, IBPC 107 or the SPC 109 to generate packets 115 for the output trace stream of the IT module 103. In one embodiment, if the instruction received is CB, the EPGC 104 forwards the CB to the CBPC 105, if the instruction received is IB, the EPGC 105 forwards the IB to the IBPC 107, and if the instruction received is updated status, the EPGC 105 forwards the updated status to the SPC 109.

The CBPC 105 may generate a CB packet upon receipt of the CB from the EPGC 104. More specifically, when there is CB as the instruction of the trace, the EPGC 104 outputs the CB to the CBPC 105, which in turn converts it into CB packet format, and generates the CB packets. In one embodiment, the CB packets may include bits in the range of 6 to 47 bits, representing 6 to 47 CB outcomes. The CB packet may include one of the TCB outcome and the NTCB outcome. As an example, NTCB is encoded as a single bit of data 0 and the TCB is encoded as a single bit of data 1. In one embodiment, the CBPC 105 collects CB outcomes, storing them in an internal buffer comprised of 6 to 47 bits, and through a population counter (not shown), determines whether all bits in the CB packet have been used. If not, the CBPC 105 continues to receive additional CBs from the trace and buffers them in the internal buffer, incrementing the population counter, until all the bits in the CB have been used. If all the bits in the CB packet have been used, then the CBPC 105 generates the CB packet. In addition to generating a CB packet on a buffer fill, CBPC 105 may include a capability to produce an incomplete CB packet upon an explicit command from EPGC 104. In one embodiment, the CBPC is implemented as a sequence of executed instructions or micro-operations (also called uops) that the machine executes to generate CB packets. In another implementation, the CBPC 105 is implemented as hardware logic.

The IBPC 107 generates an IB packet upon receipt of an IB instruction from the EPGC 104. More specifically, when there is an IB as the instruction in the trace, the EPGC 104 outputs the IB instruction to the IBPC 107, which in turn converts it into IB packet format, and generates the IB packets. As discussed above, the IB packet may include a target IP, which includes a target location or IP address for transfer of the execution in the trace. In one embodiment, the IBPC 107 is implemented as a sequence of executed instructions or micro-operations (also called uops) that the machine executes to generate an IB packet. In another implementation, the IBPC 107 is implemented as hardware logic.

The SPC 109 generates event packets upon receipt of an updated status from the EPGC 104. More specifically, when there is an update in the status in the processing device, represented by an instruction in the trace, the EPGC 104 outputs the updated status to the SPC 109, which in turn converts it into event packet format and generates the event packets. In one embodiment, the event packets reflect the updated status of the processing device, which includes, but is not limited to, an execution mode, a frequency, a page table base (CR3), an interrupt and transactional execution (TSX) begin, a TSX abort, or a TSX commit.

The IT module 103 further includes a deferral control generation component (DCGC) 112 and deferral queue 114. The DCGC 112 receives CB packets, IB packets, and event packets from the CBPC 105, IBPC 107 and SPC 109, respectively. In one embodiment, the DCGC 112 outputs the CB packets as the IT packets 115 in the output stream. In one embodiment, the CB packet is sent out in the output trace stream when a total number of bits in the byte pattern of the CB packet reach a first threshold. A first threshold may include all the bits that can be used in the CB packet. As an example, the first threshold is 6 bits. As an another example, considering a CB packet that can contain up to 46 conditional branch outcomes, with a maximum of 4 CB retirements per cycle, the threshold may be the $43^{rd}$ bit, so that all simultaneously retiring CBs per cycle can be written to the same CB packet. The deferral queue 114 may store any packets that are to be deferred prior to transmission in the output trace stream. In one embodiment, the DCGC 112 sends the IB packet to the deferral queue 114 to be stored as a deferred packet. In one embodiment, the DCGC 112 sends the event packet to the deferral queue 114 to be stored as deferred packets. In one embodiment, the IB packets and the event packets are deferred when not all the bits in the CB packet have been used. As such, the IB packets and event packets are buffered, allowing additional subsequent CB outcomes to be added to the existing CB packet in the CBPC 105.

In one embodiment, the IB packets and the event packets are sent to the output stream in the same order as they are placed in the deferral queue 114. As an example, the deferral queue 114 is a first in first out (FIFO) queue and the IB packets and the event packets are sent to the output stream as FIFO queue. In one embodiment, the deferral queue 114 sends the queued IB packets as IT packets 115 in the output trace stream immediately following the CB packet. In another embodiment, the deferral queue 114 sends the queued event packets as IT packets 115 in the output trace stream immediately following the queued IB packets. In a further embodiment, instead of sending the queue IB packets immediately following the CB packet, the deferral queue 114 sends the queued event packets as IT packets 115 in the output trace stream immediately following the CB packet and then sends the queued IB packets to immediately follow the queued event packets. In another embodiment, the IB and event packets are sent intermixed according to execution order following the CB packet. In a further embodiment, the IB and event packets are sent before the CB packet.

As discussed above, an IB instruction may include a RET instruction. In assembly language, a call (CALL) instruction transfers control to another procedure, and the corresponding RET instruction of that other procedure returns control to the instruction following the CALL instruction. In one embodiment, a RET instruction for which a decoder of an IT trace output stream can correctly predict the IP target of the said RET instruction can have its target compressed such that the RET instruction may be encoded as single outcome bit in a CB packet. The correctly predicted RET instruction may be a RET instruction with a target that matches the next linear instruction pointer (IP) of a corresponding CALL instruction associated with the RET. In another example, the RET instruction is predicted incorrectly, and the RET instruction with targets is listed explicitly in the IT trace log (i.e., not compressed) as an IB packet. These IB packets generated by non-compressable RETs are not deferrable, since compressing them could introduce ambiguity for the decoder, such that it could not definitely tell whether the RET target can be inferred from the corresponding CALL IP or not.

In one embodiment, the DCGC 112 receives a packet and determines that the packet is not deferrable and is to be sent out to the output trace stream. In one example, the packet is determined to be non-deferrable when the deferral queue 114 reaches a second threshold and cannot receive additional packets. As an example, the second threshold may be the maximum number of entries in the queue. As another example, the second threshold may be set such that the maximum number of deferrable packets that can simultaneously be generated can all be deferred or all not be deferred. Further detailing the example, for a deferred queue depth of 64, and a maximum of 5 deferrable packets per cycle, the threshold would be the $60^{th}$ entry. That is, once the $60^{th}$ entry is written in a cycle, and after the remaining simultaneously deferred packets are written that same cycle, the CB packet and the deferred packets would be sent to the output trace stream. The non-deferrable packet may be one of an IB packet or an event packet. In another example, the packet is determined to be non-deferrable when the IB packet includes a non-compressable RET instruction. Upon receipt of the non-deferrable packet, the DCGC 112 sends a command signal to the CBPC 105 to generate the CB packet, regardless of whether the CB packet is full or not. The CBPC 105 generates the CB packet and sends it to the DCGC 112, which, in turn, sends it to the output trace stream. In one embodiment, the deferral queue 114 sends all deferred packets into the output trace stream immediately following the CB packet, and the DCGC 112 then sends out the non-deferred packet immediately following the last deferred packet. In another embodiment, the deferral queue 114 sends out the deferred packets into the output trace stream and the DCGC 112 sends out the CB packet immediately following the last deferred packet. In another embodiment, the DCGC 112 sends out the non-deferred packets into the output stream and then sends out the CB packet immediately following the last non-deferred packet. In a further embodiment, the deferred and non-deferred packets are sent out into the output stream, and the CB packet is sent out immediately following one of the last deferred or the last non-deferred packet.

The IT module 103 includes a configuration component 109 coupled to the DCGC 112 and the deferral queue 114, which may allow software or firmware to configure the inclusion of CB, deferral packets and non-deferral packets in the IT packets 115 and threshold value of DCGC.

Figure 1B:
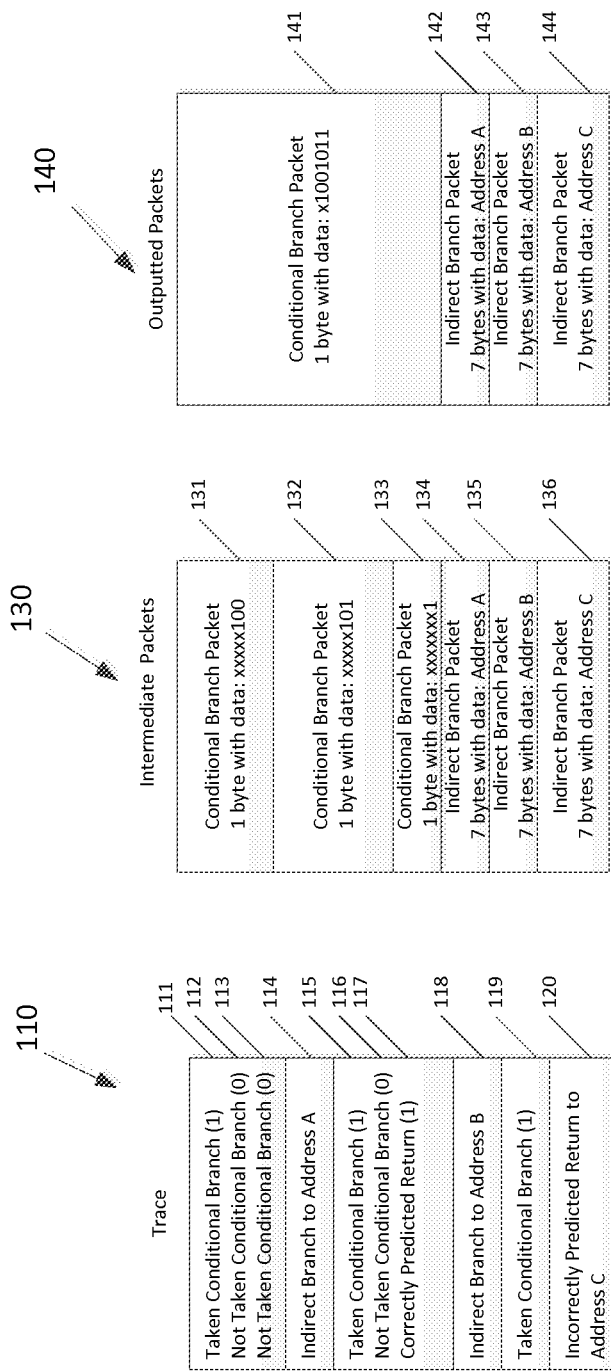
FIG. 1B illustrates examples of a control flow executed by the ITS and the corresponding instruction tracing (IT) packets generated by the ITS to minimize bandwidth to compress trace output stream.

FIG. 1B illustrates an example of mapping packets with the execution of instructions in a trace to compress the output trace stream of an IT system. The first column 110 lists instructions traced by an IT system. The second column 130 includes an exemplary intermediate version of the generated packets of the IT system corresponding to the trace instructions 110. The second column 130 may include deferred packets and CB packets accumulating bits based on instructions. The packets 131 to 136 are unaltered from what a baseline system would generate, except that they are reordered according to one embodiment of the deferral process. The third column 140 includes the actual outputted packets, corresponding to the exemplary intermediate packets 130, of an output trace stream of the IT system. The outputted packets 140 may include deferred packets and CB packets accumulating bits across deferred packets based on instructions.

As shown in FIG. 1B, a first instruction 111 in the trace 110 is a TCB. As discussed above, the TCB 111 is a CB in which the execution in the trace skips to another specified IP. As an example, the TCB 111 is encoded with data bit 1, which is added into a corresponding CB packet 131 of generated packets 130. The second instruction 112 in the trace is an NTCB. As discussed above, the NTCB is a CB in which the execution in the trace proceeds to next sequential IP. As an example, the NTCB 112 is encoded with data bit 0, which is added into the corresponding CB packet 131. The data bit 0 follows the data bit 1 in the corresponding CB packet. The third instruction 113 in the trace 110 is also an NTCB, which results in another data bit 0 added into the corresponding CB packet 131. This data bit 0 follows the data bit 0, which follows the data bit 1. As such, the CB packet 131 includes 1 byte with data, xxxxx100.

Following the third instruction 113, a fourth instruction 114 in the trace 110 is an IB to address A. As discussed above, the IB provides a target location or address for transfer of the execution in the trace. The IB may include, but not limited to, RET, far branch, interrupt, exception, INIT, TSX abort. As such, a corresponding IB packet 134 of the generated packets 130 is generated with address A as the target address. Accordingly, the IB packet 134 includes 7 bytes with data, Address A. The IB packet 134 with address A is deferred from being sent into the output trace stream.

Referring back to trace 110, execution is transferred to another TCB instruction 115. The TCB 115 is encoded with data bit 1, and added into another CB packet 132. In this exemplary intermediate representation, CB packet 132 is shown as a separate CB packet from 131 for clarity. The next instruction in the trace is an NTCB 116. The NTCB 116 is encoded with data bit 0, and added into the corresponding CB packet 132. The data bit 0 follows the data bit 1 in the CB packet 132. Following the NTCB 116 is a correctly predicted return (RET) 117. As discussed above, the correctly predicted RET 117 matches the next linear instruction pointer (IP) of a corresponding CALL instruction associated with the RET. As such, the correctly predicted RET 117 is encoded with data bit 1 and added into the corresponding CB packet 132. The data bit 1 follows the data bit 0, which follows the data bit 1 in the CB packet 132. Accordingly, the CB packet 132 includes 1 byte with data, xxxxx101.

Following the correctly predicted RET 117, another IB 118 to address B is executed in the trace 110. As such, an IB packet 135 is generated in generated packets 130 with address B as the target address for transfer of the execution in the trace. Accordingly, the IB packet 135 includes 7 bytes with data, Address B. The IB packet 135 with address B is deferred from being sent into the output stream. Referring back to trace 110, execution is then transferred to another TCB instruction 119. The TCB 119 is encoded with data bit 1 and this data bit 1 is added into another CB packet 133 of generated packets 130. In this exemplary intermediate representation, CB packet 133 is shown as a separate CB packet from 131 and 132 for clarity. As such, the CB packet 133 includes 1 byte with data, xxxxxxx1. Lack of or disabling of the deferral system in this example would have an effect of creating a new CB packet after every IB packet, the 3 CB packets, each 1 byte, require 3 bytes of output stream.

Following the TCB instruction 119, an incorrectly predicted return (RET) 120 to address C is executed in the trace 110. As discussed above, an incorrectly predicted RET lists its target explicitly in the ITS trace log (i.e., not compressed). As such, an IB packet 136 is generated in generated packets 130 with address C as the target address for transfer of the execution in the trace. Accordingly, the IB packet 136 includes 7 bytes with data, Address C. The IB packet 136 with address C is a non-deferrable packet. This causes the DCGC 112 to write out the partial CB packet, containing information from packets 131-133 and then write out the deferred packets 134 and 135 to the ITS trace log before writing packet 136 to the ITS trace log. The packets 140 in the third column depict an output order of the generated packets 130 from the IT system. The outputted packets 140 include a CB packet 141 followed by the deferred packets 142-143 transmitted in the output trace stream of the IT system followed up the non-deferrable IB packet 144. The CB packet 141 depicts the resulting packet from the CBPC 105 that added CB outcomes to a single CB packet as the DCGC deferred deferrable packets, and includes the CB outcomes from the exemplary intermediate generated CB packets 131-133 of generated packets 130. The IB packets 142-143 correspond respectively to generated IB packets 134-135. The IB packets 142-143 are deferred while the CB packet 141 contains the accumulated outcomes of the CB instructions 133-133. In this example, once the incorrectly predicted return instruction generates packet 144, the CB packet 141 is sent out to the output trace stream, followed by the deferred IB packets 142-13. Although not shown, the deferred event packets may also be sent along with the deferred IB packets into the output stream. As discussed above, when IB packets cause the creation of new CB packets, CB packets 131, 132, and 133 would require 3 bytes of output stream, and as further discussed above when CB packets can contain outcomes across IB packets, the CB packet 141 requires only 1 byte of output stream. As such, the result of the packet 140 is two bytes less than the combined length of all CB packets that would have been generated due to the lack of or disabling of the deferral component.

Figure 2A:
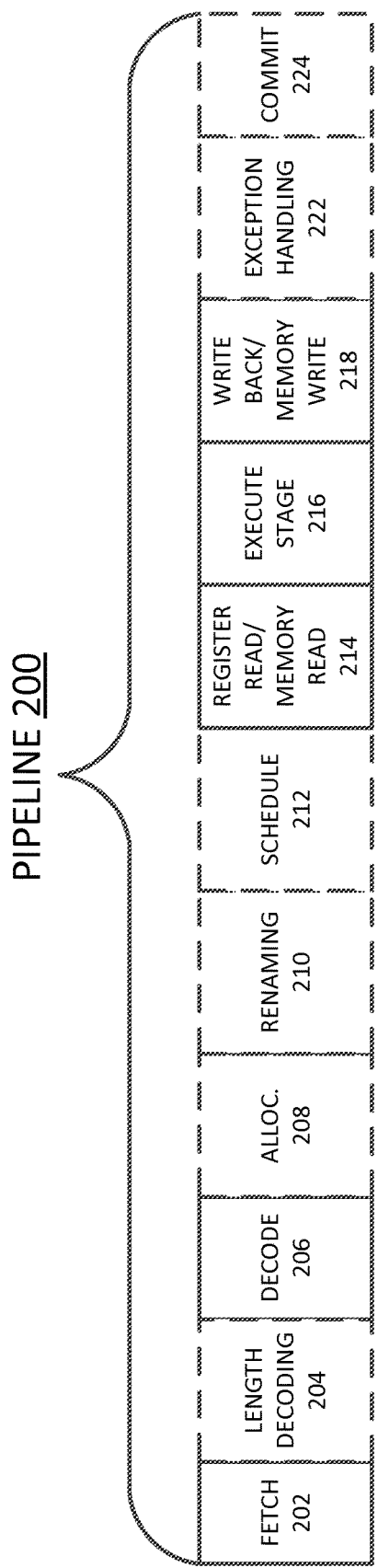
FIG. 2A is a block diagram illustrating an exemplary in order pipeline and an exemplary register renaming, out-of-order issue/execution pipeline in accordance with described embodiments.
Figure 2B:
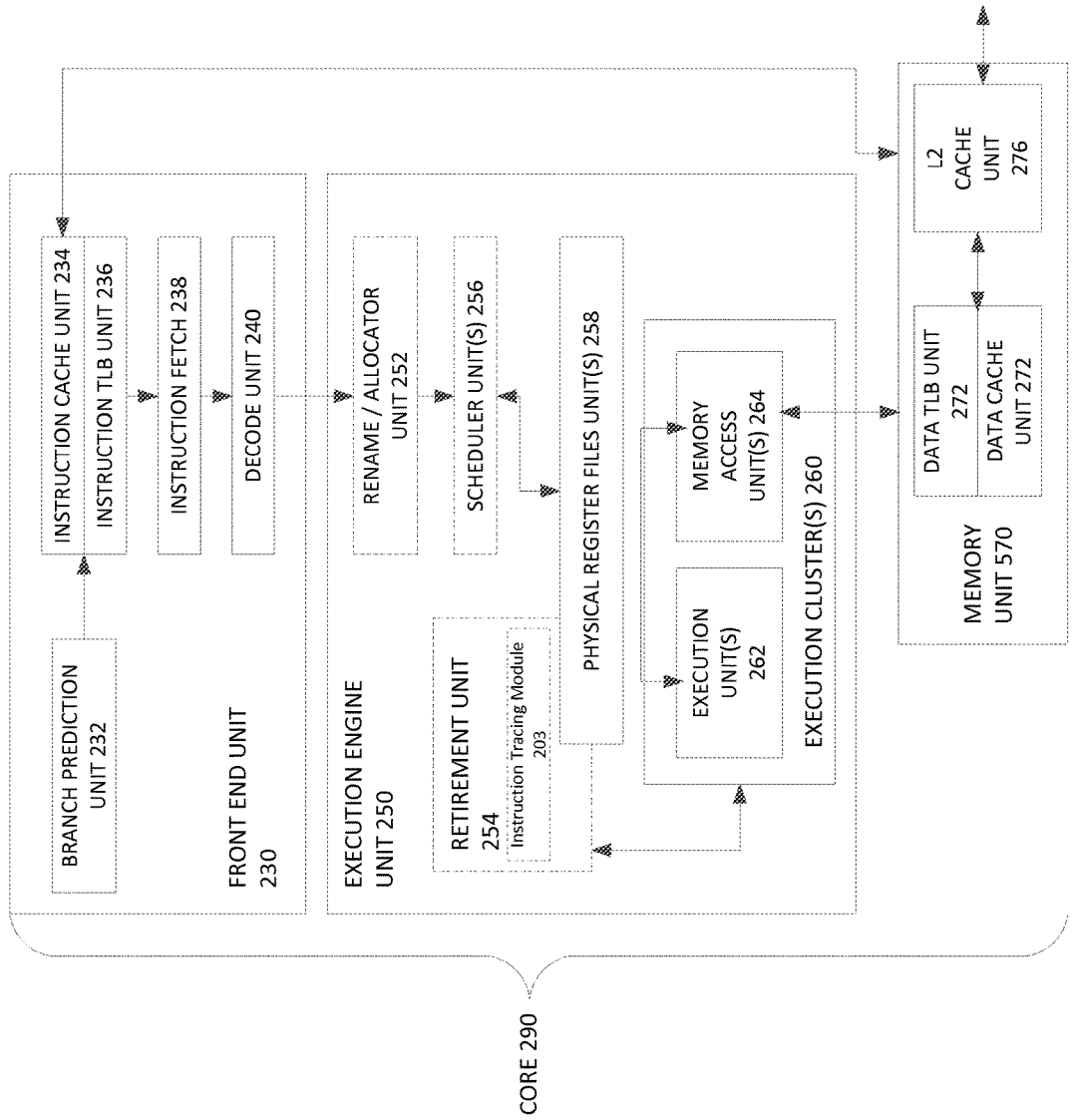
FIG. 2B is a block diagram illustrating both an exemplary embodiment of an in-order architecture core and an exemplary register renaming, out-of-order issue/execution architecture core to be included in a processor in accordance with described embodiments.

FIG. 2A is a block diagram illustrating an in-order pipeline and a register renaming stage, out-of-order issue/execution pipeline of a processor minimizing bandwidth to compress an output trace stream of an IT system according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrates the register renaming, out-of-order issue/execution pipeline. Similarly, the solid lined boxes in FIG. 2B illustrate the in-order architecture logic, while the dashed lined boxes illustrates the register renaming logic and out-of-order issue/execution logic.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224. In some embodiments, the stages are provided in a different order and different stages may be considered in-order and out-of-order.

In FIG. 2B, arrows denote a coupling between two or more units and the direction of the arrow indicates a direction of data flow between those units. FIG. 2B shows processor core 290 including a front end unit 230 coupled to an execution engine unit 250, and both are coupled to a memory unit 70.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 234 is further coupled to a level 2 (L2) cache unit 276 in the memory unit 270. The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The retirement unit 254 may include trace component 203 to generate IT packets according to embodiments of the invention. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 258 is overlapped by the retirement unit 254 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 254 and the physical register file(s) unit(s) 258 are coupled to the execution cluster(s) 260. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster —and in the case of a separate memory access pipeline, certain embodiments are implemented in which the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 38 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 3:
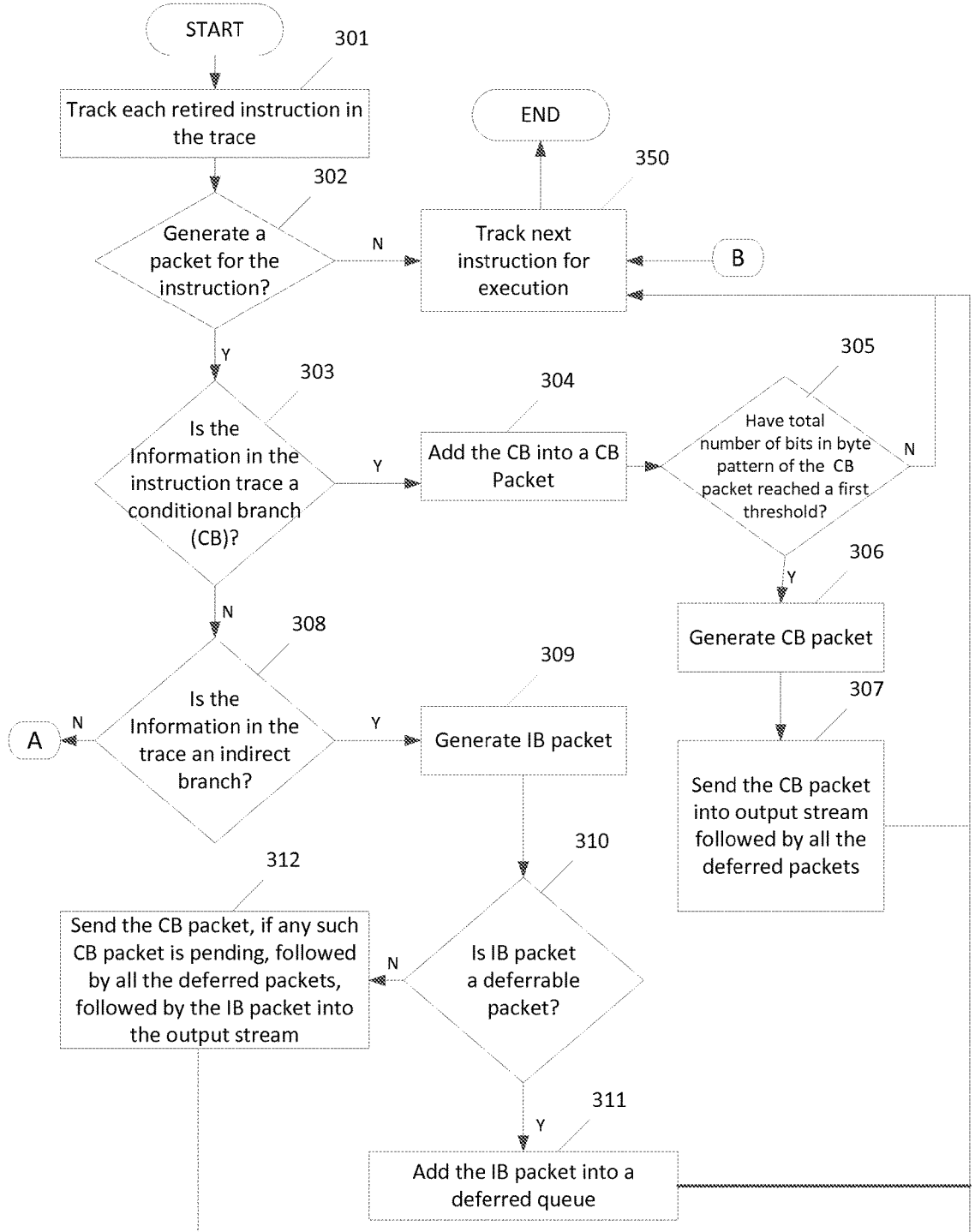
FIG. 3 is a flow diagram illustrating an example of a method for minimizing bandwidth to compress the output stream in the ITS.
Figure 3:
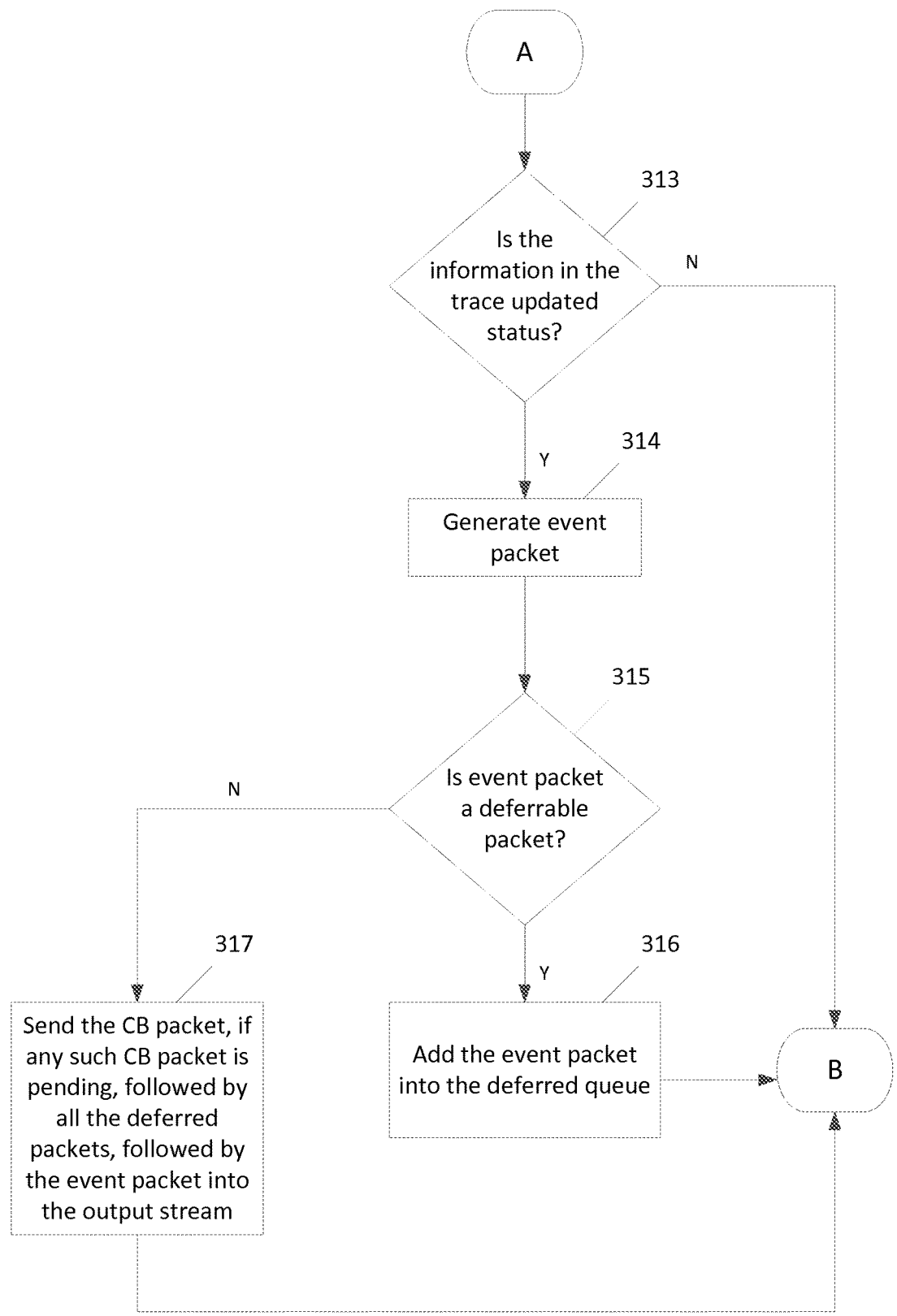

FIG. 3 is a flow diagram illustrating an example of a method 300 for minimizing bandwidth to compress an output trace stream by an instruction trace system. Method 300 may be performed by processing logic that may include hardware (e.g. circuitry, dedicated logic, programmable logic, microcode, etc.). The numbering of the blocks presented is for the sake of clarity and is not intended to prescribe an order of operations in which the various blocks may occur. In one embodiment, method 300 is performed by IT module 103 described with respect to FIG. 1A.

Beginning with block 301, the IT module tracks instructions executed by a processing device. Indications/representations of the tracked instructions are recorded in a trace. For example, the EPGC 104 tracks instructions provided by a scheduler and execution unit 102. At block 302, it is determined whether a packet is to be generated for the instruction in the trace. For example, the EPGC 104 determines whether a packet is to be generated based on execution associated with the instruction in the trace. In one embodiment, the instruction may include conditional branch (CB) associated with executed instruction in the trace. In another embodiment, the information may include an IB associated with the instruction in the trace. In further embodiments, the information may include an update in status of the processing device.

If it is determined at block 302 that there is no packet to be generated, then the method moves to block 350 where a next instruction is tracked for execution in the trace. In one example, the EPGC 104 may determine that no packet is to be generated when the information includes a comparison function associated with the instruction. If, at block 302, it is determined that a packet is to be generated, then at block 303, it is determined whether the instruction in the trace is a CB. In one example, the EPGC 104 may determine that the instruction is the CB instruction. If at block 303, it is determined that the instruction is the CB, then at block 304, the CB outcome is added into a CB packet. For example, the CBPC 105 adds the CB outcome by encoding the CB outcome into the CB packet. As discussed above, the CB may include one of a TCB and a NTCB. For example, the NTCB is encoded as a single bit of data 0 and the TCB is encoded as a single bit of data 1 into the CB packet.

At block 305, it is determined whether a total number of bits in the byte pattern of the CB packet reach a first threshold. The first threshold may be total number of bits in the CB packet that have been used. For example, the bits set as 1 or 0. If at block 305, it is determined that the total number of bits in the CB packet have not reached the first threshold, the method proceeds to block 350 where a next instruction for execution in the trace is tracked. If at block 305, it is determined that the total number of bits in the byte pattern of the CB packets have reached the first threshold, the CBPC 105 generates the CB packet at block 306. At block 307, the generated CB packet is sent in the output trace stream, followed by deferred packets. In one example, the DCGC 112 sends the CB packet in the output trace stream, while the deferral queue 114 sends the deferred packets in the output trace stream. Method 300 then proceeds to block 350 where a next instruction for execution in the trace is tracked.

If, at block 303, it is determined that the instruction in the trace is not a CB, then at block 308, it is determined whether the instruction is an IB. In one example, the EPGC 104 determines that the instruction is an IB instruction. As discussed above, the IB provides a target location or address for transfer of the execution in the trace. If, at block 308, it is determined that the instruction is an IB, then at block 309, an IB packet is generated. As an example, the IB packet is generated by the IPGC 107. At block 310, it is determined whether the IB packet is a deferrable packet. In one embodiment, the IB packet may be deferrable when the total number of bits in the byte pattern of the CB packet has not reach the first threshold. If at block 310, it is determined that the IB packet is a deferrable packet, then at block 311, the IB packet is added to a deferred queue. In one embodiment, the DCGC 112 sends the IB packet to deferral queue 114 to be added as the deferred queue. Method 300 then proceeds to block 350 where the next instruction is tracked for execution in the trace.

If, at block 310, it is determined that the IB packet is not deferrable, then at block 312, the CB packet, if any such CB packet is pending, is sent to the output trace stream, followed by the deferred packets, and then followed by the non-deferrable IB packet. In one example, the IB packet is not deferrable when the total number of packets in the deferral queue 114 has reached a second threshold and as a result cannot receive any additional packets. Method then proceeds to block 350 where the next instruction is tracked for execution in the trace.

Returning to block 308, if it is determined that the instruction in the trace is not an IB, then, at block 313, it is determined whether the instruction in the trace is an updated status of the processing device. In one example, the EPGC 104 determines that the instruction includes an updated status of the processing device. If, at block 313, it is determined that the instruction is the updated status, then at block 314, an event packet is generated. As an example, the event packet is generated by the EPGC 109.

At block 315, it is determined whether the event packet is a deferrable packet. In one embodiment, the event packet may be deferrable when the total number of bits in the byte pattern of the CB packet has not reached the first threshold. If at block 315, the event packet is deferrable, then at block 316, the event packet is added in the deferred queue. Method 300 then proceeds to block 350 where the next instruction is tracked for execution in the trace.

If, at block 315, it is determined that the event packet is not deferrable, then at block 317, the CB packet, if any such CB packet is pending, is sent to the output trace stream, which is followed by the deferred packets, which are followed by the non-deferrable event packet. In one example, the event packet is not deferrable when total number of packets in the deferral queue 114 has reached a second threshold and as a result cannot receive additional packets. Subsequently, method 300 proceeds to block 350 where the next instruction is tracked for execution in the trace.

Figure 4:
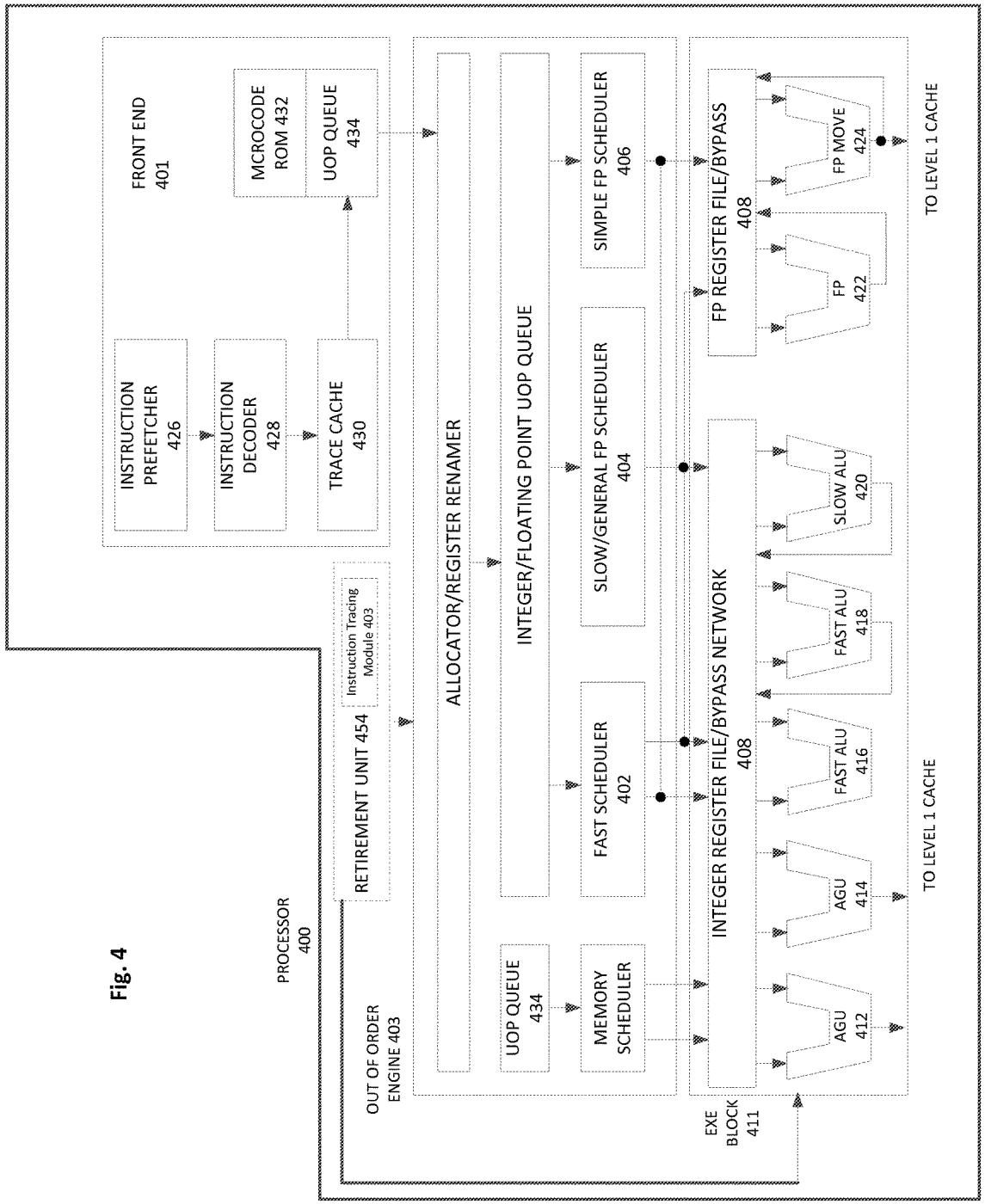
FIG. 4 is a block diagram illustrating a processor according to one embodiment.

FIG. 4 is a block diagram illustrating a micro-architecture for a processor 400 that includes logic circuits to perform instructions in accordance with one embodiment of the invention. In one embodiment, processor 400 minimizes bandwidth to compress an output trace stream of a trace system. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 401 is the part of the processor 400 that fetches instructions to be executed and prepares them to be used later in the processor pipeline. The front end 401 may include several units. In one embodiment, the instruction prefetcher 426 fetches instructions from memory and feeds them to an instruction decoder 428, which in turn decodes or interprets them. For example, in one embodiment, the decoder decodes a received instruction into one or more operations called "microinstructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others use several micro-ops to complete the full operation. In one embodiment, if more than four micro-ops are needed to complete an instruction, the decoder 428 accesses the microcode ROM 432 to do the instruction. For one embodiment, an instruction can be decoded into a small number of micro ops for processing at the instruction decoder 428. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406 determine when a uop is ready to execute based on the readiness of their dependent input register operand sources and the availability of the execution resources the uops use to complete their operation. The fast scheduler 402 of one embodiment can schedule on each half of the main clock cycle while the other schedulers can schedule once per main processor clock cycle. The schedulers arbitrate for the dispatch ports to schedule uops for execution.

Register files 408, 410 sit between the schedulers 402, 404, 406, and the execution units 412, 414, 416, 418, 420, 422, 424 in the execution block 411. There is a separate register file 208, 410 for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the microinstructions use to execute. The execution block 411 may include real time trace component to generate IT packets. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 422, 424, execute floating point, MMX, SIMD, and SSE, or other operations. The floating point ALU 422 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 420 as the slow ALU 420 includes integer execution hardware for long latency type of operations, such as a multiplier, shifts, flag logic, and branch processing. Memory load/store operations are executed by the AGUs 412, 414. For one embodiment, the integer ALUs 416, 418, 420 are described in the context of performing integer operations on 64 bit data operands. In alternative embodiments, the ALUs 416, 418, 420 can be implemented to support a variety of data bits including 16, 32, 128, 256, etc. Similarly, the floating point units 422, 424 can be implemented to support a range of operands having bits of various widths. For one embodiment, the floating point units 422, 424 can operate on 128 bits wide packed data operands in conjunction with SIMD and multimedia instructions.

In one embodiment, the uops schedulers 402, 404, 406 dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 400 contains a retirement unit 454 coupled to the out of order engine 403 and to the execution block 411. The retirement unit 454 may include trace component 403 to generate IT packets according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 5A:
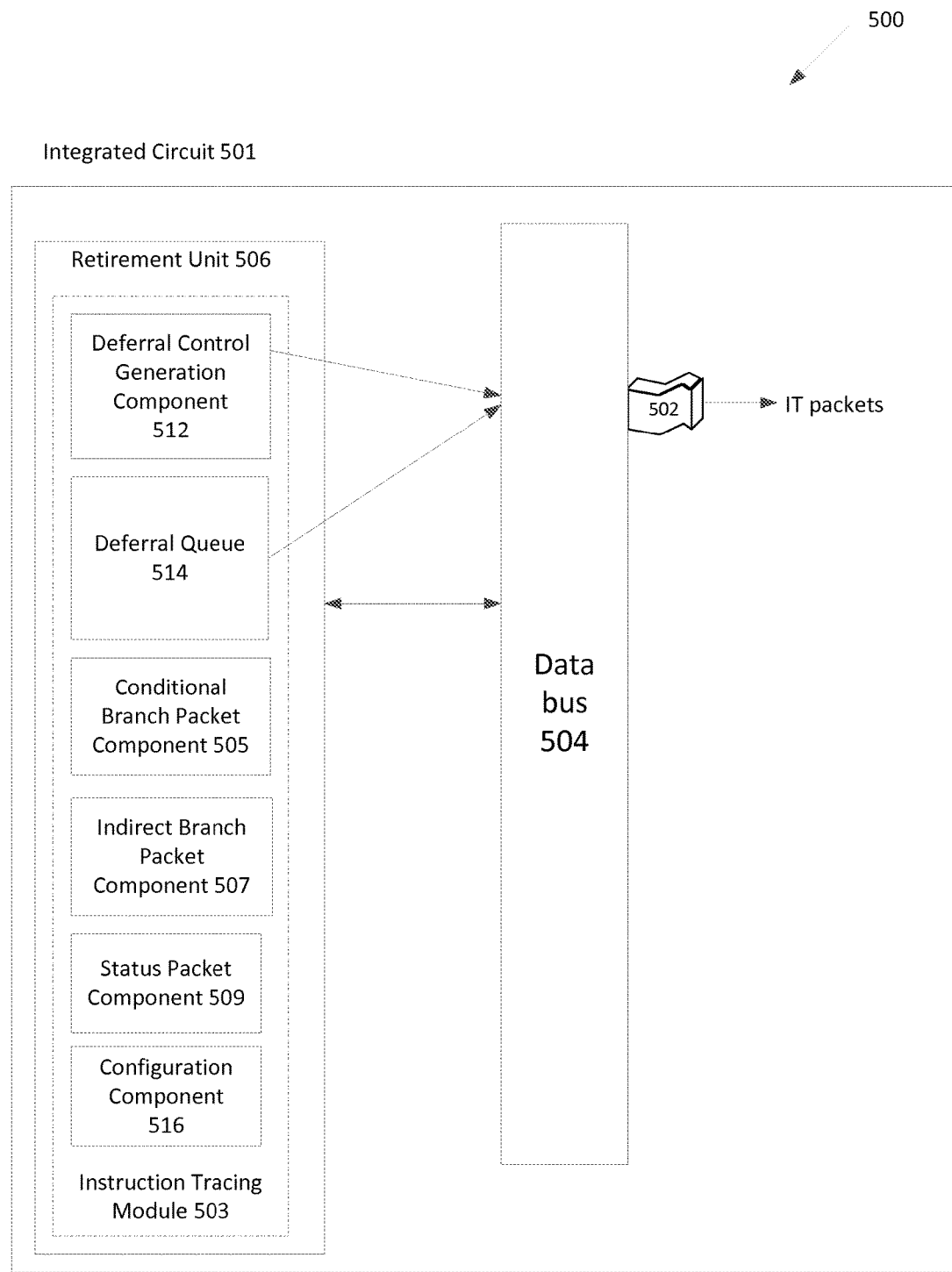
FIG. 5A is a block diagram illustrating a processor according to one embodiment.

FIG. 5A illustrates an alternative exemplary architecture in accordance with which embodiments may operate. In one embodiment, the integrated circuit 501 includes instruction tracing logic 503 to trace instructions of a traced application, mode, or code region, as the instructions are executed by the integrated circuit 501; a retirement unit 506 to minimize bandwidth to compress an output trace stream of an IT system. The retirement unit may include a conditional branch packet component 505 to generate a plurality of conditional branch packets describing a condition associated with an execution for an instruction in the trace. The retirement unit 506 to also include an indirect branch packet component 507 to generate a plurality of indirect branch packets describing a target address for transfer of the execution for the instruction in the trace. The retirement unit 506 to also include a status packet component 509 to generate a plurality of event packets providing updated status of the processing device for the instruction in the trace. The retirement unit 506 also includes a deferral control generation component 512 to defer output of the packets in the packet log. The retirement unit 506 also includes a deferral queue component 514 to store the indirect branch packets and the event packets in a deferred queue. The retirement unit to also include a configuration component 516, which allows software to configure inclusion of packets in the IT packets. In one embodiment, the retirement unit 506 implements the instruction tracing logic 503.

In one embodiment, the retirement unit 506 includes ITS logic to implement the instruction tracing module 503. In one embodiment, the IT logic implementing the instruction tracing component 503 includes a conditional branch packet 505, indirect branch packet component 507, status packet component 509, and configuration component 516. In one embodiment, deferral control generation component 512 outputs packets, such as the IT packets 502 depicted on the data bus 504. In one embodiment, deferral queue component 514 also outputs packets such as the IT packets 502 depicted on the data bus 504. In one embodiment, logic implementing the instruction tracing component 503 may be implemented in hardware. In one embodiment, logic implementing the instruction tracing component 503 may be implemented in microcode. In one embodiment, logic implementing the instruction tracing component 503 may be implemented in a combination hardware and microcode.

In one embodiment, the integrated circuit is a Central Processing Unit (CPU). In one embodiment, the central processing unit is utilized for one of a tablet computing device or a smartphone.

In accordance with one embodiment, such an integrated circuit 501 thus initiates instruction tracing (e.g., via instruction tracing module 503) for instructions of a traced application, mode, or code region, as the instructions are executed by the integrated circuit 501; generates a conditional branch (CB) packet (e.g., via conditional branch packet component 505 as controlled by the instruction tracing component 503) having a byte pattern (e.g. representing a plurality of CB instruction) in a packet log. In one embodiment, integrated circuit 501 generates and outputs the CB packet into an output trace stream when total number of bits in the byte pattern reaches a first threshold. In another embodiment, integrated circuit 501 generates and outputs the CB packet into an output trace stream when a total number of packets in a deferral queue 114 reach a second threshold. In a further embodiment, integrated circuit 501 generates and outputs the CB packet into an output trace stream when an instruction in a trace after the instruction of the CB is not deferrable. In one embodiment, the integrated circuit 501 generates a plurality of indirect branch packets (e.g. via indirect branch component 507 as controlled by the instruction tracing component 503); the plurality of indirect branch packets provide target location for transfer of execution for the instruction in the trace. In one embodiment, the integrated circuit 501 generates a plurality of event packets (e.g. via status packet component 509 as controlled by the instruction tracing component 503); the plurality of event packets provide updated status of the processing device for the instruction in the trace.

In one embodiment, the integrated circuit 501 stores the IB packets and the event packets into a deferred queue (e.g. via deferral queue 514 as controlled by the instruction tracing component 503). In one embodiment, the IB packets and the event packets are stored in the deferred queue when the instructions corresponding to the IB packets and the events packets are deferrable. In one embodiment, the integrated circuit 501 outputs the generated CB packet followed by the deferred packets (e.g. via deferral control generation component 512 as controlled by the instruction tracing component 503) into the packet log of the output stream. In one embodiment, the deferred packets are outputted in a same queue order as stored in the deferred queue.

Figure 5B:
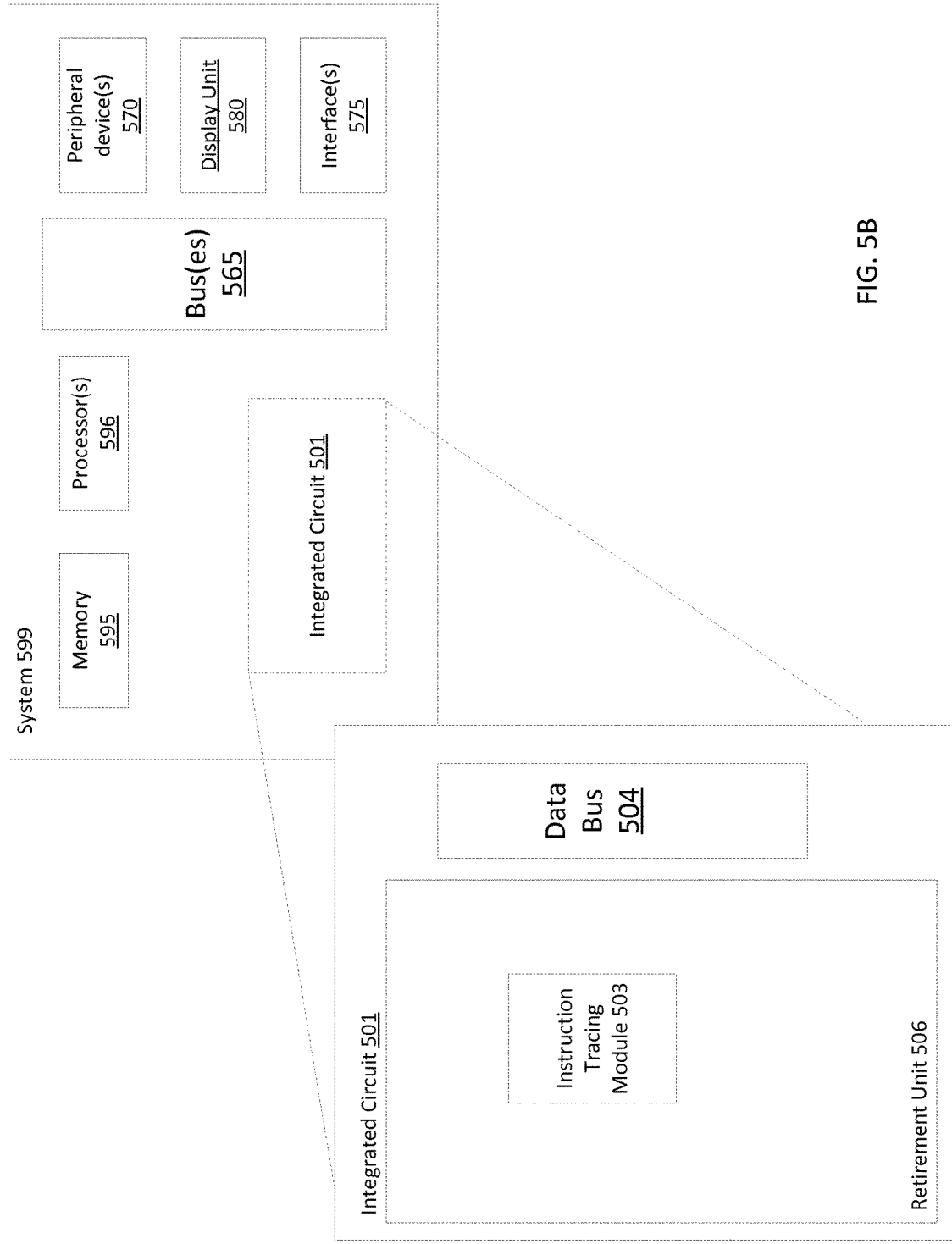
FIG. 5B shows a diagrammatic representation of a system in accordance with which embodiments may operate, be installed, integrated, or configured.

FIG. 5B shows a diagrammatic representation of a system 599 in accordance with which embodiments may operate, be installed, integrated, or configured.

In one embodiment, system 599 includes a memory 595 and a processor or processors 596. For example, memory 595 may store instructions to be executed and processor(s) 596 may execute such instructions. System 599 includes communication bus(es) 565 to transfer transactions, instructions, requests, and data within system 599 among a plurality of peripheral device(s) 570 communicably interfaced with one or more communication buses 565 and/or interface(s) 575. Display unit 580 is additionally depicted within system 599.

Distinct within system 599 is integrated circuit 501, which may be installed and configured in a compatible system 599, or manufactured and provided separately so as to operate in conjunction with appropriate components of system 599.

In accordance with one embodiment, system 599 includes at least a display unit 580 and an integrated circuit 501. The integrated circuit 501 may operate as, for example, a processor or as another computing component of system 599. In such an embodiment, the integrated circuit 501 of system 599 includes at least: a data bus 504, and an instruction tracing signal 503 including a state packet generation component (not shown) and event packet generation component (not shown) to generate a plurality of IT packets describing the traced instructions. In one embodiment, the IT packets include information describing a status of the processor and a synchronization point in the traced instructions.

In accordance with one embodiment, such a system 599 embodies a tablet or a smartphone, in which the display unit 580 is a touchscreen interface of the tablet or the smartphone; and further in which the integrated circuit 501 is incorporated into the tablet or smartphone.

Figure 6:
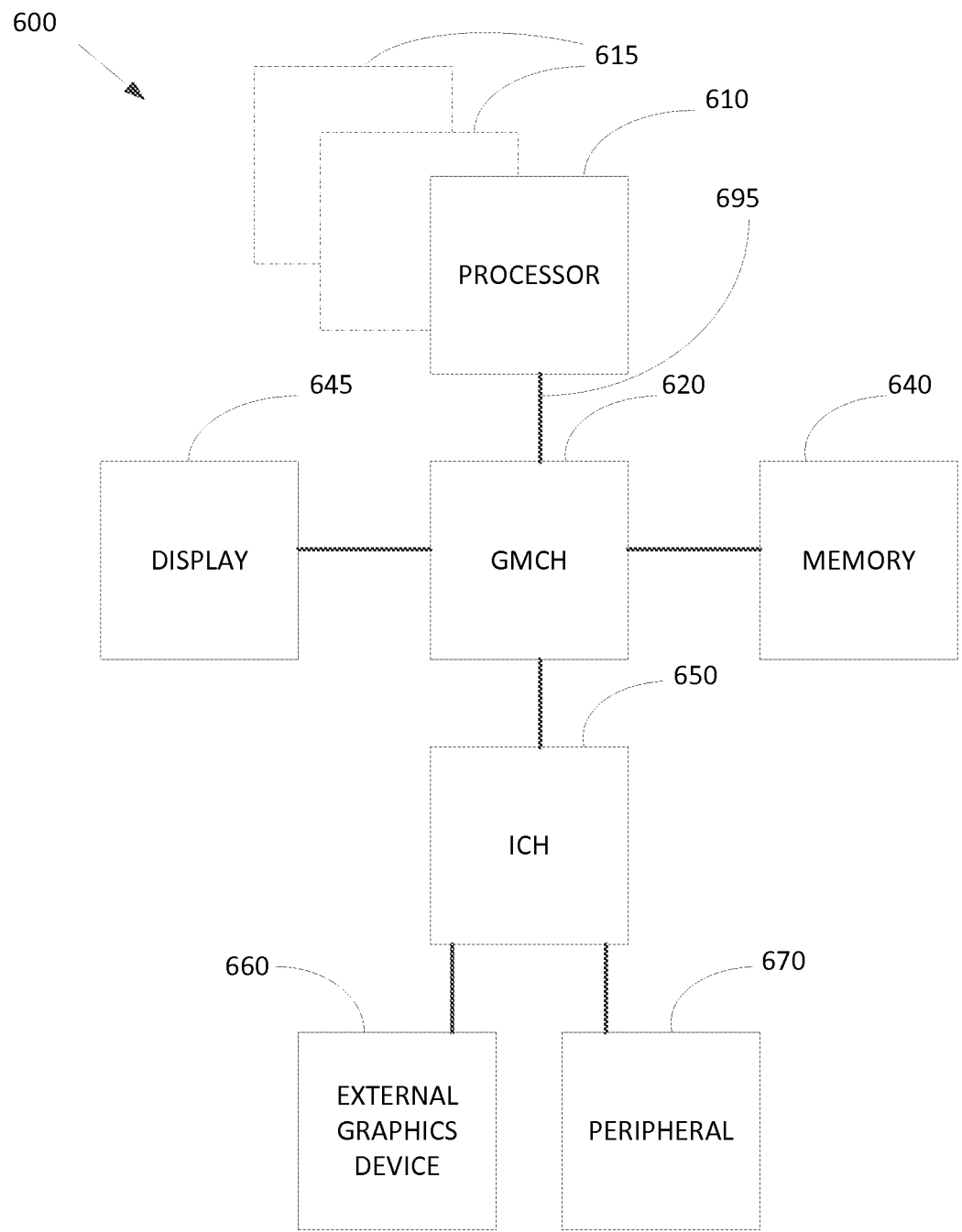
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, processors 610, 615 minimizes bandwidth to compress an output trace stream of an IT system.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
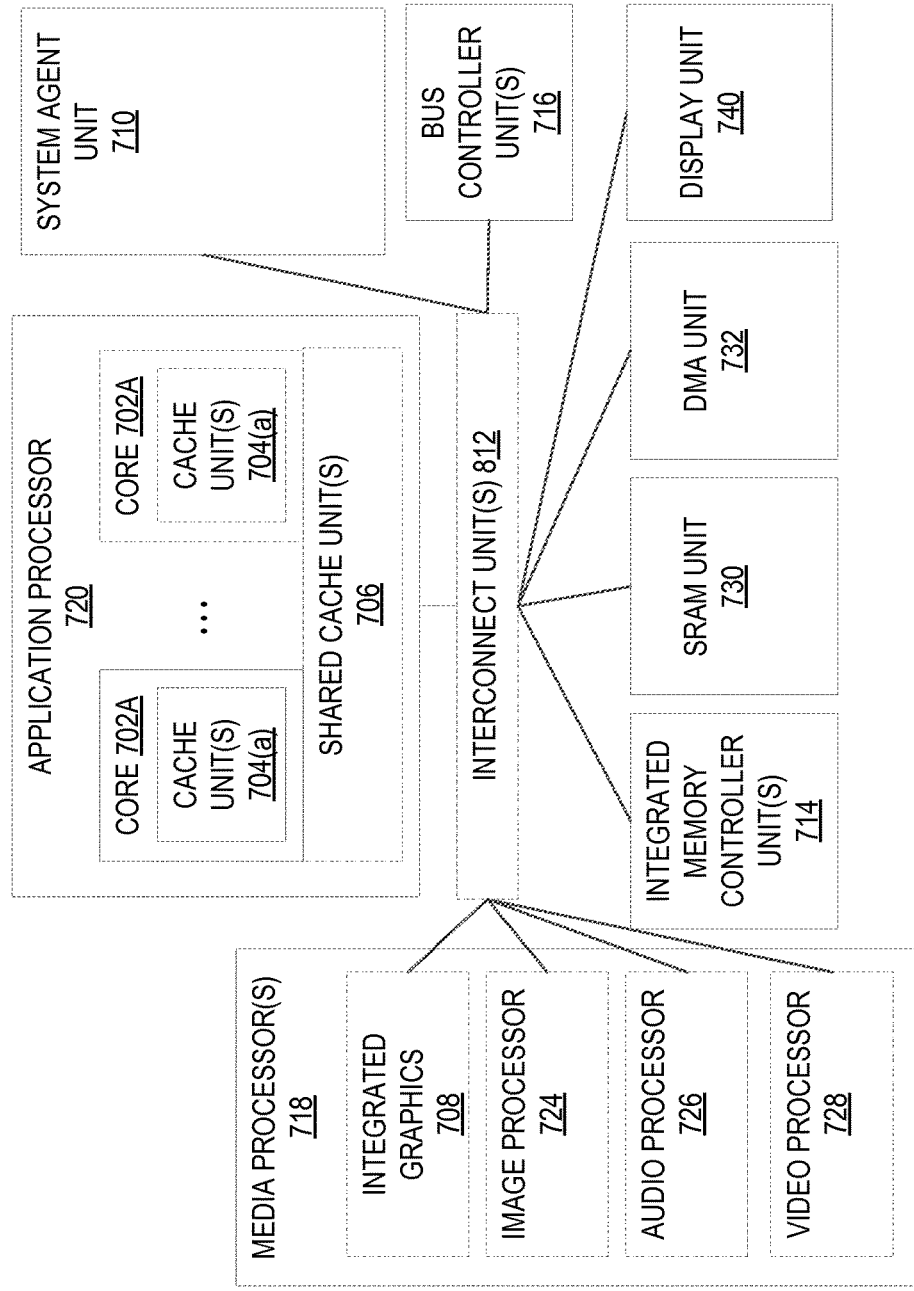
FIG. 7 is a block diagram of a system on chip (SoC) in accordance with an embodiment of the present disclosure.

Embodiments may be implemented in many different system types. FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, a memory module may be included in the integrated memory controller unit(s) 714. In another embodiment, the memory module may be included in one or more other components of the SoC 700 that may be used to access and/or control a memory. The application processor 720 may include an conditional branch, indirect branch and event execution logics as described in embodiments herein.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multithreading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 720 may be from another company, such as ARM Holdings™, Ltd, MIPS™, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
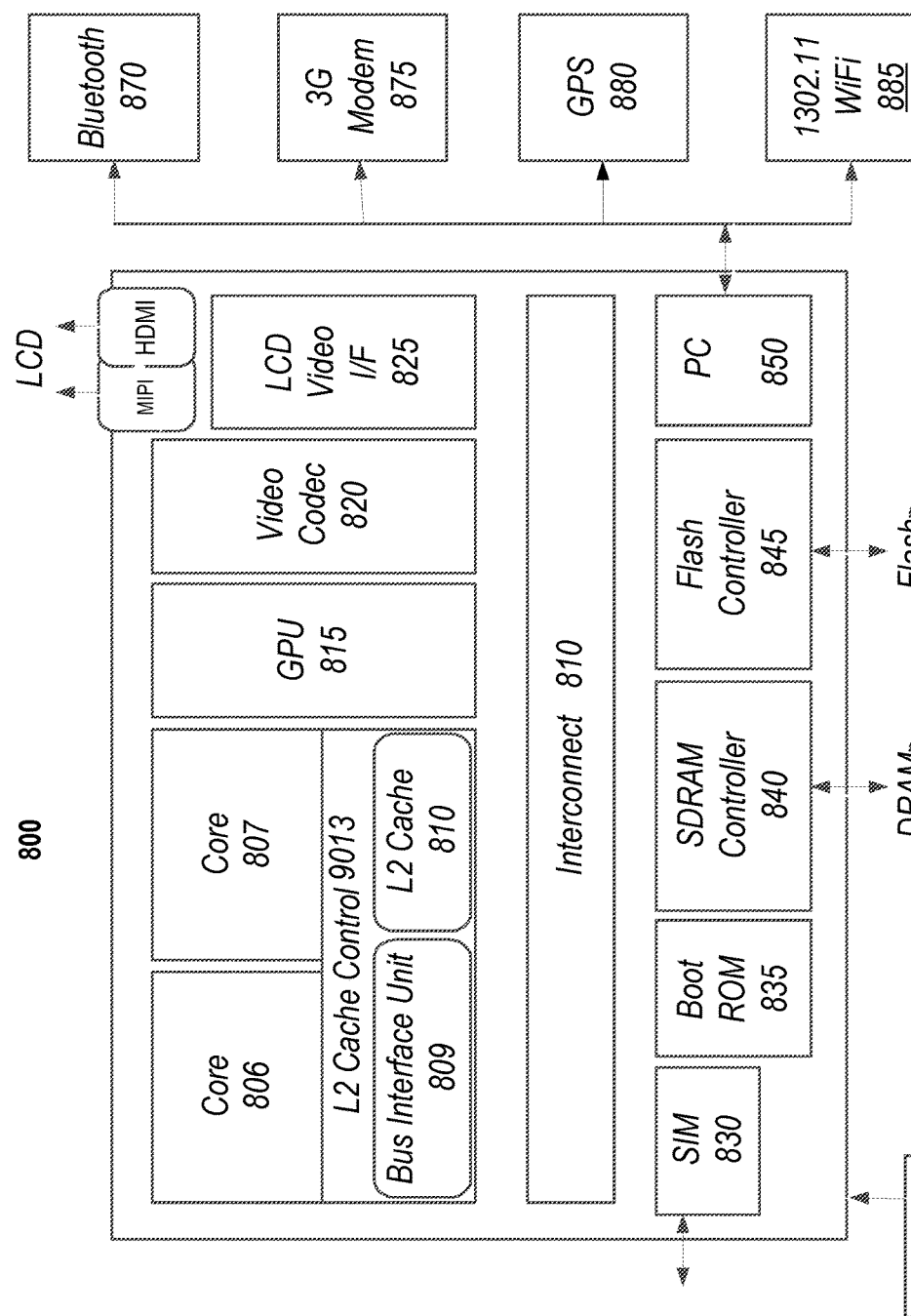
FIG. 8 is a block diagram of an embodiment of a system on-chip (SOC) design.

FIG. 8 is a block diagram of an embodiment of a system on-chip (SoC) design in accordance with the present disclosure. As a specific illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 808 and L2 cache 810 to communicate with other parts of system 800. Interconnect 810 includes an on-chip interconnect, such as an IOSF, AMBA, or other interconnect discussed above, which potentially implements one or more aspects of the described disclosure. In one embodiment, a conditional branch, indirect branch and event execution logics may be included in cores 806, 807.

Interconnect 810 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein. In addition, the system 800 illustrates peripherals for communication, such as a Bluetooth module 870, 3G modem 875, GPS 880, and Wi-Fi 885.

Figure 9:
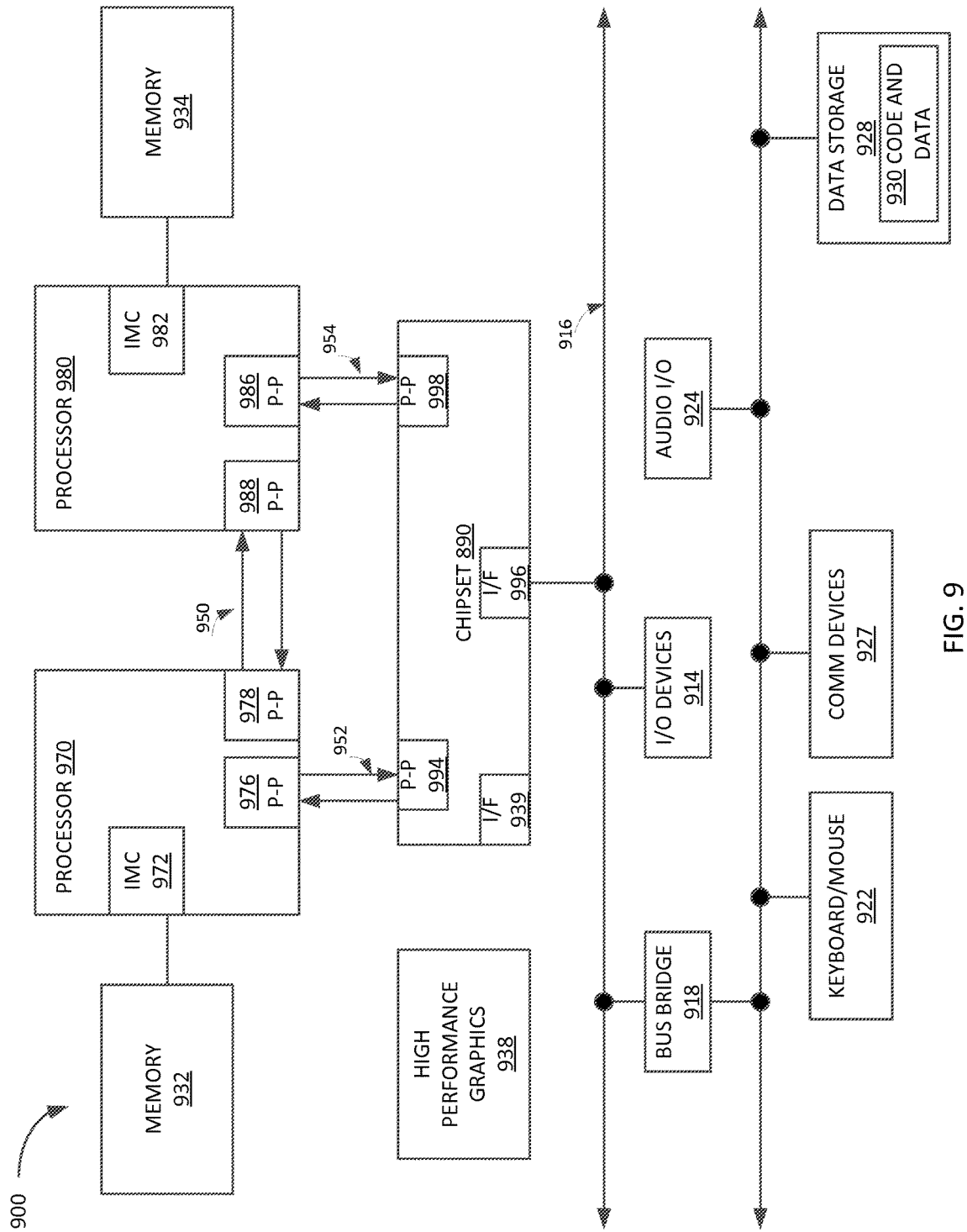
FIG. 9 illustrates a block diagram of a computer system according to one embodiment.

Referring now to FIG. 9, shown is a block diagram of a system 900 in accordance with an embodiment of the invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processors of the computing systems as described herein. In one embodiment, processors 970, 980 minimizes bandwidth to compress an output trace stream of an IT system.

While shown with two processors 970, 980, it is to be understood that the scope of the disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970 and 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
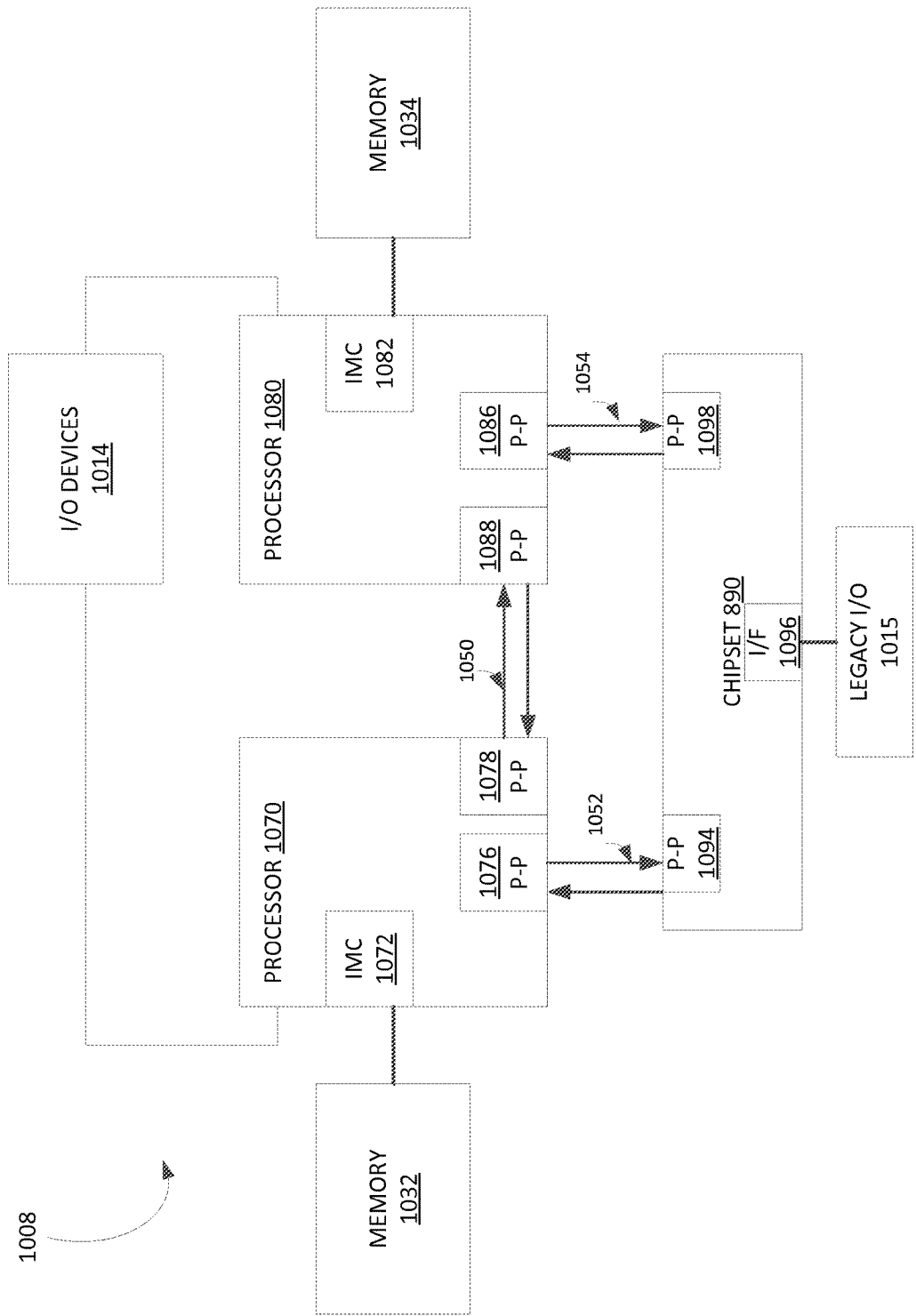
FIG. 10 illustrates a block diagram of a computer system according to one embodiment.

Referring now to FIG. 10, shown is a block diagram of a system 1000 in accordance with an embodiment of the invention. FIG. 10 illustrates processors 1070, 1080. In one embodiment, processors 1070, 1080 minimizes bandwidth to compress an output trace stream of an IT system. Furthermore, processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnect 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
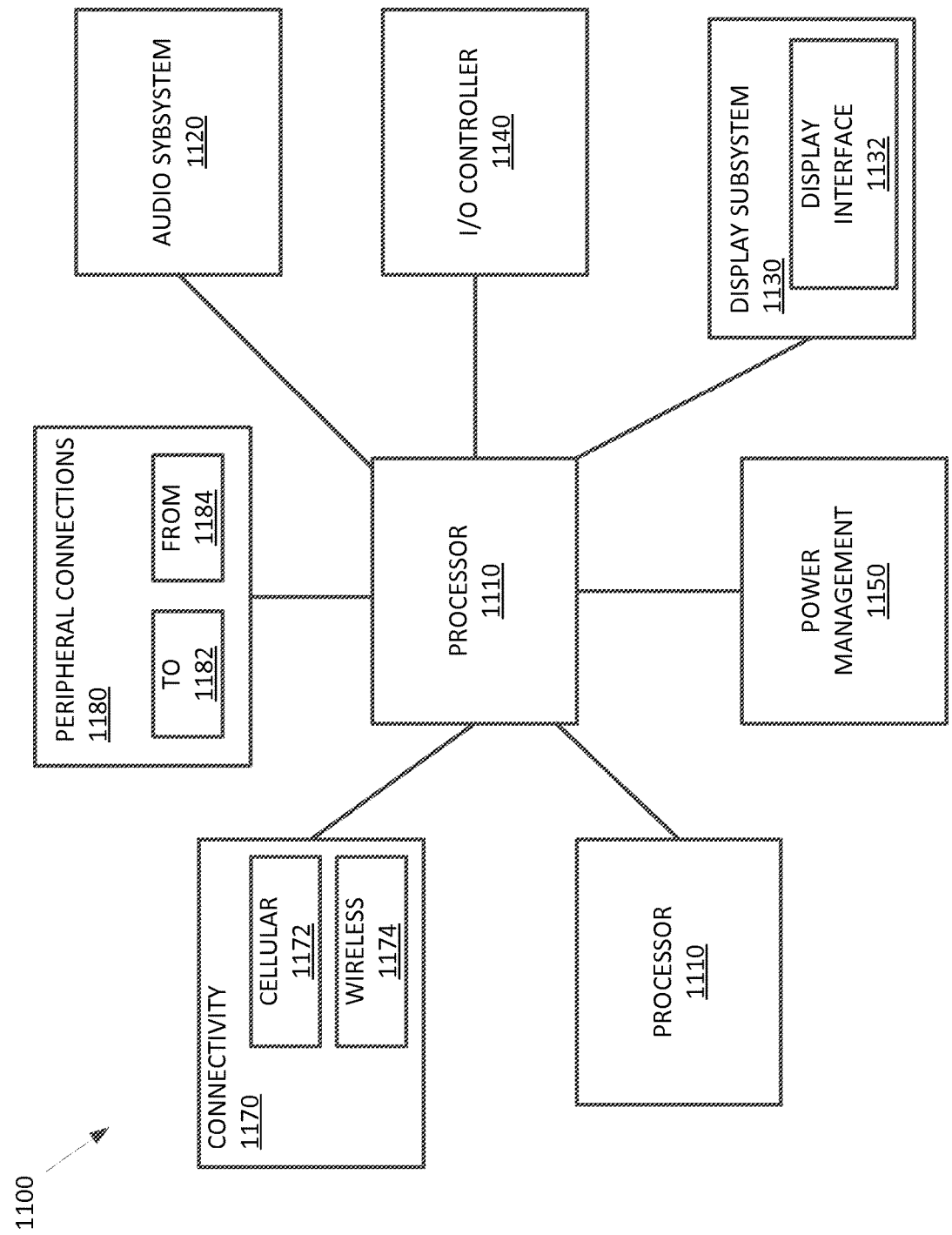
FIG. 11 illustrates block diagram of an embodiment of tablet computing device, a smartphone, or other mobile device in which touchscreen interface connectors are used.

FIG. 11 illustrates a block diagram 1100 of an embodiment of tablet computing device, a smartphone, or other mobile device in which touchscreen interface connectors may be used. Processor 1110 may minimizes bandwidth to compress an output trace stream of an IT system. In addition, processor 1110 performs the primary processing operations. Audio subsystem 1120 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1110.

Display subsystem 1130 represents hardware (e.g., display devices) and software (e.g., drivers) components that provide a visual and/or tactile display for a user to interact with the tablet computing device or smartphone. Display subsystem 1130 includes display interface 1132, which includes the particular screen or hardware device used to provide a display to a user. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to the tablet computing device or smartphone through which a user might interact. In one embodiment, I/O controller 1140 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1150 that manages battery power usage, charging of the battery, and features related to power saving operation. Memory subsystem 1160 includes memory devices for storing information in the tablet computing device or smartphone. Connectivity 1170 includes hardware devices (e.g., wireless and/or wired connectors and communication hardware) and software components (e.g., drivers, protocol stacks) to the tablet computing device or smartphone to communicate with external devices. Cellular connectivity 1172 may include, for example, wireless carriers such as GSM (global system for mobile communications), CDMA (code division multiple access), TDM (time division multiplexing), or other cellular service standards). Wireless connectivity 1174 may include, for example, activity that is not cellular, such as personal area networks (e.g., Bluetooth), local area networks (e.g., WiFi), and/or wide area networks (e.g., WiMax), or other wireless communication.

Peripheral connections 1180 include hardware interfaces and connectors, as well as software components (e.g., drivers, protocol stacks) to make peripheral connections as a peripheral device ("to" 1182) to other computing devices, as well as have peripheral devices ("from" 1184) connected to the tablet computing device or smartphone, including, for example, a "docking" connector to connect with other computing devices. Peripheral connections 1180 include common or standards-based connectors, such as a Universal Serial Bus (USB) connector, DisplayPort including MiniDisplayPort (MDP), High Definition Multimedia Interface (HDMI), Firewire, etc.

Figure 12:
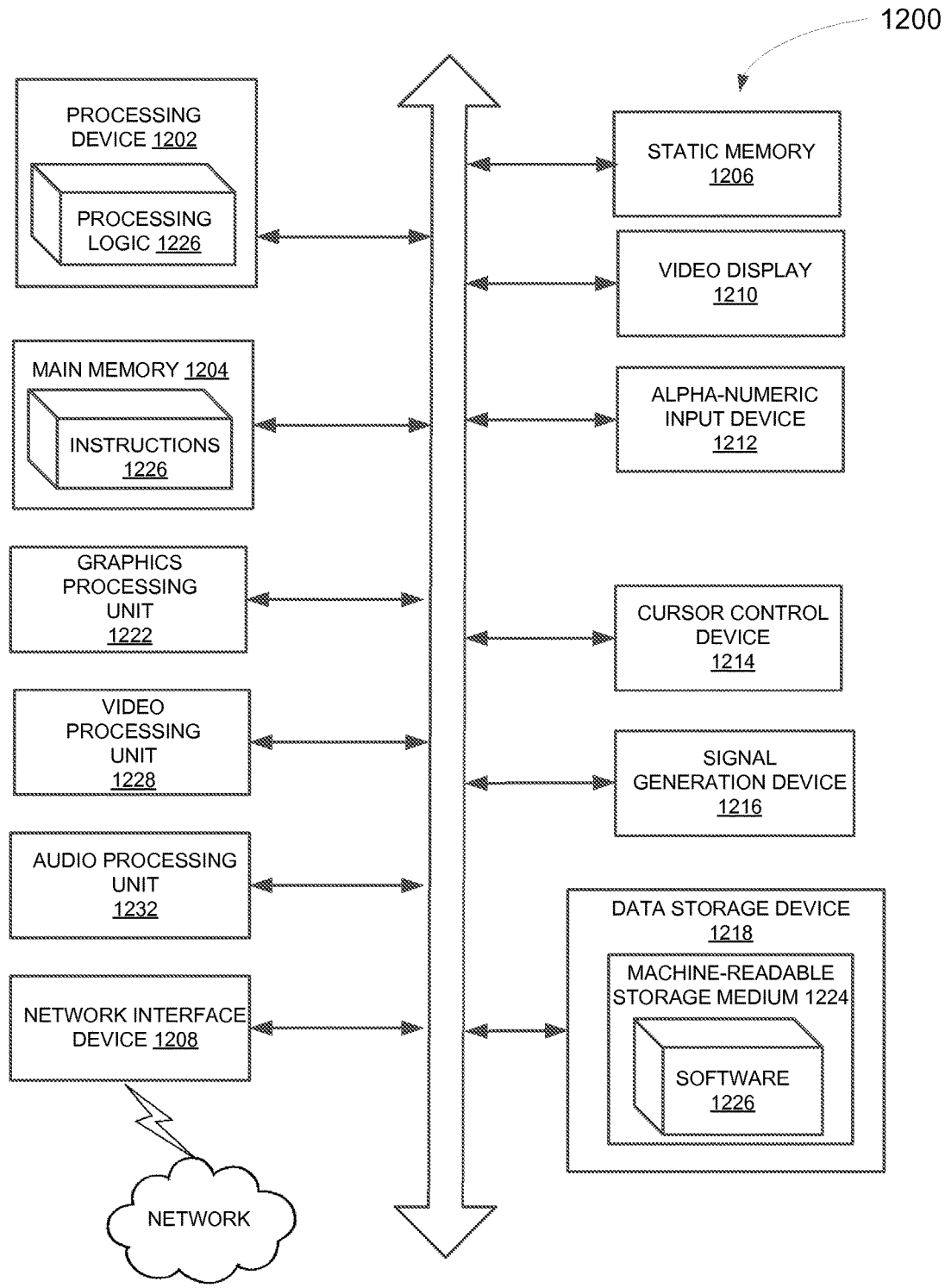
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 is the same as processing device 120 described with respect to FIG. 1A that implements the instruction trace module 103 and scheduler and execution unit 102. Alternatively, the computing system 1200 can include other components as described herein.

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the real time instruction trace component 103 and the scheduler and execution unit 102, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing device minimizing bandwidth to compress the output stream in an instruction tracing system comprising an instruction tracing (IT) module to identify a current instruction in a trace of the IT module as a conditional branch (CB) instruction; execute one of generate a CB packet comprising a byte pattern with an indication of outcome of the CB instruction, or add an indication of the outcome of the CB instruction to the byte pattern of an existing CB packet; generate a packet when a subsequent instruction in the trace after the current instruction is not the CB instruction, wherein the packet is different from the CB packet; add the packet into a deferred queue when the packet is deferrable; output the CB packet followed by the deferred packet into a packet log when at least one of a first, a second or a third condition is met, wherein the first condition comprises total number of bits in the byte pattern of the existing CB packet reach a first threshold, wherein the second condition comprises total number of packets in the deferred queue reach a second threshold, and wherein the third condition comprises a subsequent instruction in the trace, after the current instruction associated with the CB, generates the packet that is not deferrable.

In Example 2, the subject matter of Example 1 can optionally include the packet is an indirect branch (IB) packet, wherein the IB packet provides a target location for transfer of execution associated with the instruction in the trace.

In Example 3, the subject matter of any of Examples 1-2 can optionally include the IT module to determine that the IB packet is not deferrable when the instruction comprises an uncompressible return instruction. In Example 4, the subject matter of any of Examples 1-3 can optionally include wherein the packet is an event packet that provides an updated status of the processing device.

In Example 5, the subject matter of any of Examples 1-4 can optionally include wherein the IT module to continue to add subsequent packets into the deferred queue when the subsequent packets are deferrable. In Example 6, the subject matter of any of Examples 1-5 can optionally include wherein the deferred packets are outputted in the output log as a first in first out (FIFO) queue.

Example 7 is a system minimizing bandwidth to compress the output stream in an instruction tracing system. In Example 7, the system includes a memory and a processing device communicably coupled to the memory, the processing device comprising a scheduler and execution unit and a retirement unit communicably coupled to the scheduler and execution unit. Further to Example 7, the retirement unit comprising an instruction tracing (IT) module to identify a current instruction in a trace of the IT module as a conditional branch (CB) instruction; execute one of generate a CB packet comprising a byte pattern with an indication of outcome of the CB instruction, or add an indication of the outcome of the CB instruction to the byte pattern of an existing CB packet; generate a packet when a subsequent instruction in the trace after the current instruction is not the CB instruction, wherein the packet is different from the CB packet; add the packet into a deferred queue when the packet is deferrable; output the CB packet followed by the deferred packet into a packet log when at least one of a first, a second or a third condition is met, wherein the first condition comprises total number of bits in the byte pattern of the existing CB packet reach a first threshold, wherein the second condition comprises total number of packets in the deferred queue reach a second threshold, and wherein the third condition comprises a subsequent instruction in the trace, after the current instruction associated with the CB, generates the packet that is not deferrable.

In Example 8, the subject matter of Example 7 can optionally include wherein the packet is an indirect branch (IB) packet, wherein the IB packet provides a target location for transfer of execution associated with the instruction in the trace.

In Example 9, the subject matter of Examples 7-8 can optionally include wherein the IT module to determine that the IB packet is not deferrable when the instruction comprises an uncompressible return instruction. In Example 10, the subject matter of Examples 7-9 can optionally include wherein the packet is an event packet that provides an updated status of the processing device.

In Example 11, the subject matter of Examples 7-10 can optionally include wherein the IT module to continue to add subsequent packets into the deferred queue when the subsequent packets are deferrable. In Example 12, the subject matter of Examples 7-11 can optionally include wherein the deferred packets are outputted in the output log as a first in first out (FIFO) queue.

Example 13 is a method for minimizing bandwidth to compress the output stream in an instruction tracing system comprising identifying a current instruction in a trace of the IT module as a conditional branch (CB) instruction; executing one of generate a CB packet comprising a byte pattern with an indication of outcome of the CB instruction, or add an indication of the outcome of the CB instruction to the byte pattern of an existing CB packet; generating a packet when a subsequent instruction in the trace after the current instruction is not the CB instruction, wherein the packet is different from the CB packet; adding the packet into a deferred queue when the packet is deferrable; outputting the CB packet followed by the deferred packet into a packet log when at least one of a first, a second or a third condition is met, wherein the first condition comprises total number of bits in the byte pattern of the existing CB packet reach a first threshold, wherein the second condition comprises total number of packets in the deferred queue reach a second threshold, and wherein the third condition comprises a subsequent instruction in the trace, after the current instruction associated with the CB, generates the packet that is not deferrable.

In Example 14, the subject matter of Example 13 can optionally include wherein the packet is an indirect branch (IB) packet, wherein the IB packet provides a target location for transfer of execution associated with the instruction in the trace.

In Example 15, the subject matter of Examples 13-14 can optionally include further comprising determining that the IB packet is not deferrable when the instruction comprises an uncompressible return instruction. In Example 16, the subject matter of claims 13-15 can optionally include wherein the packet is an event packet that provides an updated status of the processing device.

In Example 17, the subject matter of Examples 13-16 can optionally include further comprising continuously adding subsequent packets into the deferred queue when the subsequent packets are deferrable. In Example 18, the subject matter of claims 13-17 can optionally include wherein the deferred packets are outputted in the output log as a first in first out (FIFO) queue.

Example 19 is a non-transitory medium for minimizing bandwidth to compress the output stream in an instruction tracing system. In Example 18, the non-transitory computer-readable medium includes data that, when accessed by a processing device, cause the processing device to perform operations comprising identifying a current instruction in a trace of the IT module as a conditional branch (CB) instruction; executing one of generate a CB packet comprising a byte pattern with an indication of outcome of the CB instruction, or add an indication of the outcome of the CB instruction to the byte pattern of an existing CB packet; generating a packet when a subsequent instruction in the trace after the current instruction is not the CB instruction, wherein the packet is different from the CB packet; adding the packet into a deferred queue when the packet is deferrable; outputting the CB packet followed by the deferred packet into a packet log when at least one of a first, a second or a third condition is met, wherein the first condition comprises total number of bits in the byte pattern of the existing CB packet reach a first threshold, wherein the second condition comprises total number of packets in the deferred queue reach a second threshold, and wherein the third condition comprises a subsequent instruction in the trace, after the current instruction associated with the CB, generates the packet that is not deferrable.

In Example 20, the subject matter of Example 19 can optionally include wherein the packet is an indirect branch (IB) packet, wherein the IB packet provides a target location for transfer of execution associated with the instruction in the trace.

In Example 21, the subject matter of Examples 19-20 can optionally include wherein the operations further comprising determining that the IB packet is not deferrable when the instruction comprises an uncompressible return instruction. In Example 22, the subject matter of claims 19-21 can optionally include wherein the packet is an event packet that provides an updated status of the processing device.

In Example 23, the subject matter of Examples 19-22 can optionally include Wherein the operations further comprising continuously adding subsequent packets into the deferred queue when the subsequent packets are deferrable. In Example 24, the subject matter of claims 19-23 can optionally include wherein the deferred packets are outputted in the output log as a first in first out (FIFO) queue.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1210 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
an instruction tracing (IT) module to:
identify a current instruction in a trace of the IT module as a conditional branch (CB) instruction;
execute one of generate a first CB packet comprising a byte pattern with an indication of outcome of the CB instruction, or add an indication of the outcome of the CB instruction to the byte pattern of an existing CB packet;
generate an IT packet in response to determining that a subsequent instruction in the trace after the current instruction is not the CB instruction, wherein the IT packet is different from the first CB packet or the existing CB packet;
add the IT packet into a deferred queue in response to determining that the packet is deferrable, wherein the deferred queue comprises a deferred packet;
output the first CB packet or the existing CB packet followed by the deferred packet, followed by the IT packet into a packet log in response to determining that the IT packet is not deferrable, wherein determining that the IT packet is not deferrable is based on at least one of a first or a second condition is met, wherein the first condition comprises a total number of bits in the byte pattern of the first CB packet or the existing CB packet reach a first threshold, wherein the second condition comprises a total number of packets in the deferred queue reach a second threshold.

2. The processing device of claim 1 wherein the IT packet is an indirect branch (IB) packet, wherein the IB packet provides a target location for transfer of execution associated with the instruction in the trace.

3. The processing device of claim 2 wherein the IT module to determine that the IB packet is not deferrable in response to determining that the instruction comprises an uncompressible return instruction.

4. The processing device of claim 1 wherein the IT packet is an event packet that provides an updated status of the processing device.

5. The processing device of claim 1 wherein the IT module to continue to add subsequent packets into the deferred queue in response to determining that the subsequent packets are deferrable.

6. The processing device of claim 5 wherein the deferred packets are outputted in the output log as a first in first out (FIFO) queue.

7. A system comprising:
a memory; and
a processing device communicably coupled to the memory, wherein the processing device comprising:
a scheduler and execution unit; and
a retirement unit communicably coupled to the scheduler and execution unit, the retirement unit comprising an instruction tracing (IT) module to:
identify a current instruction in a trace of the IT module as a conditional branch (CB) instruction;
execute one of generate a first CB packet comprising a byte pattern with an indication of outcome of the CB instruction, or add an indication of the outcome of the CB instruction to the byte pattern of an existing CB packet;
generate an IT packet in response to determining that a subsequent instruction in the trace after the current instruction is not the CB instruction, wherein the IT packet is different from the first CB packet or the existing CB packet;
add the IT packet into a deferred queue in response to determining that the packet is deferrable, wherein the deferred queue comprises a deferred packet;
output the first CB packet or the existing CB packet followed by the deferred packet, followed by the IT packet into a packet log in response to determining that the IT packet is not deferrable, wherein determining that the IT packet is not deferrable is based on at least one of a first or a second condition is met, wherein the first condition comprises a total number of bits in the byte pattern of the first CB packet or the existing CB packet reach a first threshold, wherein the second condition comprises a total number of packets in the deferred queue reach a second threshold.

8. The system of claim 7 wherein the IT packet is an indirect branch (IB) packet, wherein the IB packet provides a target location for transfer of execution associated with the instruction in the trace.

9. The system of claim 8 wherein the IT module to determine that the IB packet is not deferrable in response to determining that the instruction comprises an uncompressible return instruction.

10. The system of claim 7 wherein the IT packet is an event packet that provides an updated status of the processing device.

11. The system of claim 7 wherein the IT module to continue to add subsequent packets into the deferred queue in response to determining that the subsequent packets are deferrable.

12. The system of claim 11 wherein the deferred packets are outputted in the output log as a first in first out (FIFO) queue.

13. A method of a processing device comprising:
identifying a current instruction in a trace of the IT module as a conditional branch (CB) instruction;
executing one of generate a first CB packet comprising a byte pattern with an indication of outcome of the CB instruction, or add an indication of the outcome of the CB instruction to the byte pattern of an existing CB packet;
generating a an IT packet in response to determining that a subsequent instruction in the trace after the current instruction is not the CB instruction, wherein the IT packet is different from the first CB packet or the existing CB packet;
adding the IT packet into a deferred queue in response to determining that the packet is deferrable, wherein the deferred queue comprises a deferred packet;
outputting the first CB packet or the existing CB packet followed by the deferred packet, followed by the IT packet into a packet log in response to determining that the IT packet is not deferrable, wherein determining that the IT packet is not deferrable is based on at least one of a first or a second condition is met, wherein the first condition comprises a total number of bits in the byte pattern of the first CB packet or the existing CB packet reach a first threshold, wherein the second condition comprises a total number of packets in the deferred queue reach a second threshold.

14. The method of claim 13, wherein the IT packet is an indirect branch (TB) packet, wherein the IB packet provides a target location for transfer of execution associated with the instruction in the trace.

15. The method of claim 14 further comprising determining that the IB packet is not deferrable in response to determining that the instruction comprises an uncompressible return instruction.

16. The method of claim 13 wherein the IT packet is an event packet that provides an updated status of the processing device.

17. The method of claim 13 further comprising continuously adding subsequent packets into the deferred queue in response to determining that the subsequent packets are deferrable.

18. The method of claim 17 wherein the deferred packets are outputted in the output log as a first in first out (FIFO) queue.

19. A non-transitory machine-readable storage medium including data that, when accessed by a processing device, cause the processing device to perform operations comprising:
  identifying a current instruction in a trace of the IT module as a conditional branch (CB) instruction;
  executing one of generate a first CB packet comprising a byte pattern with an indication of outcome of the CB instruction, or add an indication of the outcome of the CB instruction to the byte pattern of an existing CB packet;
  generating an IT packet in response to determining that a subsequent instruction in the trace after the current instruction is not the CB instruction, wherein the IT packet is different from the first CB packet or the existing CB packet;
  adding the IT packet into a deferred queue in response to determining that the packet is deferrable, wherein the deferred queue comprises a deferred packet;
  outputting the first CB packet or the existing CB packet followed by the deferred packet, followed by the IT packet into a packet log in response to determining that the IT packet is not deferrable, wherein determining that the IT packet is not deferrable is based on at least one of a first or a second condition is met, wherein the first condition comprises a total number of bits in the byte pattern of the first CB packet or the existing CB packet reach a first threshold, wherein the second condition comprises a total number of packets in the deferred queue reach a second threshold.

20. The non-transitory machine-readable storage medium of claim 19, wherein the IT packet is an indirect branch (TB) packet, wherein the IB packet provides a target location for transfer of execution associated with the instruction in the trace.

21. The non-transitory machine-readable storage medium of claim 20, wherein the operations further comprising determining that the IB packet is not deferrable in response to determining that the instruction comprises an uncompressible return instruction.

22. The non-transitory machine-readable storage medium of claim 19, wherein the IT packet is an event packet that provides an updated status of the processing device.

23. The non-transitory machine-readable storage medium of claim 19 wherein the operations further comprising continuously adding subsequent packets into the deferred queue in response to determining that the subsequent packets are deferrable.

24. The non-transitory machine-readable storage medium of claim 23, wherein the deferred packets are outputted in the output log as a first in first out (FIFO) queue.

* * * * *